United States Patent
Biles

(10) Patent No.: US 7,743,238 B2
(45) Date of Patent: Jun. 22, 2010

(54) ACCESSING ITEMS OF ARCHITECTURAL STATE FROM A REGISTER CACHE IN A DATA PROCESSING APPARATUS WHEN PERFORMING BRANCH PREDICTION OPERATIONS FOR AN INDIRECT BRANCH INSTRUCTION

(75) Inventor: Stuart David Biles, Cambridge (GB)

(73) Assignee: ARM Limited, Cambridge (GB)

( * ) Notice: Subject to any disclaimer, the term of this patent is extended or adjusted under 35 U.S.C. 154(b) by 507 days.

(21) Appl. No.: 10/434,367

(22) Filed: May 9, 2003

(65) Prior Publication Data

US 2004/0225838 A1  Nov. 11, 2004

(51) Int. Cl.
G06F 9/00 (2006.01)
(52) U.S. Cl. .................................................. 712/239
(58) Field of Classification Search ................ 711/140, 711/141, 118; 712/205, 220, 237, 239
See application file for complete search history.

(56) References Cited

U.S. PATENT DOCUMENTS

| | | | | |
|---|---|---|---|---|
| 5,099,419 | A * | 3/1992 | Nomura | 712/233 |
| 5,117,493 | A * | 5/1992 | Jensen | 711/140 |
| 5,557,769 | A * | 9/1996 | Bailey et al. | 711/146 |
| 5,600,848 | A * | 2/1997 | Sproull et al. | 712/42 |
| 5,694,568 | A * | 12/1997 | Harrison et al. | 711/213 |
| 5,956,747 | A * | 9/1999 | Wilhelm et al. | 711/140 |
| 6,279,106 | B1 * | 8/2001 | Roberts | 712/239 |
| 6,622,153 | B1 * | 9/2003 | Lee et al. | 708/523 |
| 6,934,830 | B2 * | 8/2005 | Kadambi et al. | 712/214 |

OTHER PUBLICATIONS

Yung, Robert and Neil C. Wilhelm. "Caching Processor General Registers." IEEE: 1995.*
Hennessy, John L. and David A. Patterson. "Computer Architecture: A Quantitative Approach." Second Edition. Morgan Kaufmann: 1996. p. 392.*
Zalamea et al., "Two-Level Hierarchical Register File Organization for VLIW Processors", 2000, pp. 1-10.*
Cruz et al., "Multiple-Banked Register File Architectures", Jun. 12-14, 2000, 10 pages.*
Bray et al., "A Two-Level Windowed Register File", Dec. 1991, 23 pages.*
Hennessy and Patterson, "Computer Architecture—A Quantitative Approach, $2^{nd}$ Edition", 1996, pp. 75, 100.*

* cited by examiner

*Primary Examiner*—David J Huisman
(74) *Attorney, Agent, or Firm*—Nixon & Vanderhye P.C.

(57) ABSTRACT

The present invention relates to a data processing apparatus and method for accessing items of architectural state. The data processing apparatus comprises a plurality of registers operable to store items of architectural state, and a plurality of functional units, each functional unit being operable to perform a processing operation with reference to one or more of those items of architectural state. At least one of the functional units has a register cache associated therewith having one or more cache entries, each cache entry being operable to store a copy of one of the items of architectural state, and a register identifier identifying the register containing that item of architectural state. Control logic is operable to determine a subset of the items of architectural state to be copied in the register cache in dependence on the processing operation of the functional unit with which the register cache is associated. This assists in alleviating demands on access ports associated with the registers.

4 Claims, 11 Drawing Sheets

ACCESSING ITEMS OF ARCHITECTURAL STATE FROM A REGISTER CACHE IN A DATA PROCESSING APPARATUS WHEN PERFORMING BRANCH PREDICTION OPERATIONS FOR AN INDIRECT BRANCH INSTRUCTION

BACKGROUND OF THE INVENTION

1. Field of the Invention

The present invention relates to the accessing of items of architectural state within a data processing apparatus.

2. Description of the Prior Art

The data processing apparatus will have architectural state associated therewith. Typically, some architectural state is associated with each instruction executed by a functional unit within the data processing apparatus, whilst other architectural state will relate to overall operational status of the functional unit or units within the data processing apparatus. Within such a data processing apparatus, it is known to provide certain items of architectural state within a plurality of registers. When a functional unit within the data processing apparatus needs to perform a processing operation with reference to one of those items of architectural state, then it will typically access the relevant register via an access port associated with the plurality of registers. Hence, the plurality of registers, which may for example be formed as a bank of registers, will typically have a predetermined number of write ports associated therewith and a predetermined number of read ports associated therewith. Hence, a functional unit can retrieve an item of architectural state from a particular register via a read port, and can write an item of architectural state to a particular register via a write port.

As data processing apparatus become more complex, the number of functional units within the data processing apparatus is tending to increase. For example, the data processing apparatus may be provided with a separate load/store unit, arithmetic logic unit, multiply, unit, etc and may support multiple instruction issue or concurrent execution of different instructions within those multiple functional units. This increase in complexity increases the demand placed on the access ports, and particularly the read ports, associated with the plurality of registers. In particular, as the instruction issue rate of a processor is sought to be increased, it becomes increasingly important for an instruction's operand(s) to be available promptly. For register-based operands, this places increasing demands on the availability of read ports in the register file containing the plurality of registers.

One approach for reducing this demand is to increase the number of read ports, but each read port has an associated cost in terms of gate count, area and signal loading.

Accordingly, it is an object of the present invention to provide a technique which allows such demand on the read ports to be alleviated.

SUMMARY OF THE INVENTION

Viewed from a first aspect, the present invention provides a data processing apparatus, comprising: a plurality of registers operable to store items of architectural state; a plurality of fictional units, each functional unit being operable to perform a processing operation with reference to one or more of said items of architectural state; at least one of said functional units having a register cache associated therewith having one or more cache entries, each cache entry being operable to store a copy of one of said items of architectural state and a register identifier identifying the register containing that item of architectural state; and control logic operable to determine a subset of said items of architectural state to be copied in said register cache in dependence on the processing operation of the fictional unit with which said register cache is associated.

In accordance with the present invention, at least one of the functional units within the data processing apparatus has a register cache associated therewith that has one or more cache entries. The register cache may be provided within the functional unit or may be provided elsewhere within the data processing apparatus. Further, the register cache need not be associated with only one functional unit, and could for example be associated with multiple functional units.

Each cache entry is operable to store a copy of one of the items of architectural state stored within the plurality of registers along with a register identifier identifying the register containing that item of architectural state. Furthermore, in accordance with the present invention, control logic is operable to determine a subset of the items of architectural state to be copied in the register cache in dependence on the processing operation of the functional unit with which the register cache is associated.

Accordingly, the present invention provides a caching scheme associated with at least one of the functional units that aims to exploit temporal locality in the register number used by certain sorts of processing operation by keeping a cached copy of the item(s) of architectural state stored in each such register. Hence, a register cache can be associated with a functional unit where it is expected that there will be some locality of reference with regard to the register numbers referenced by that functional unit. As an example, a multiply-accumulate unit will typically repeat the multiply-accumulate operation iteratively with the result of the accumulation after each iteration being stored in one predetermined register. Accordingly, the present invention can be used to cache that accumulate value avoiding the need for the register to be read each time. This in turn enables a reduction in the demand on the read ports associated with the plurality of registers. It will be appreciated by those skilled in the art that there are many other examples where there would be expected to be some temporal locality in the register number used by certain sorts of operation performed within particular functional units, and indeed a number of examples will be discussed later herein.

It will be appreciated that the register cache associated with a particular functional unit may be implemented in a variety of ways. For example, the entire register cache may be provided within the functional unit, or alternatively at least a portion of the register cache may be provided elsewhere within the data processing apparatus, for example within control logic used to control the various elements of the data processing apparatus. Hence, as an example, the portion of each cache entry used to store a copy of an item of architectural state may be located within the functional unit, whilst the portion of the cache entry containing the register identifier may be located within the control logic.

In one embodiment each cache entry in the register cache has a valid field operable to indicate whether the content of that cache entry is valid. Accordingly, when a copy of one of said items of architectural state is initially stored in a cache entry, the valid field can be set to indicate that valid data is contained within that cache entry. The valid field can then subsequently be re-set if it is determined that the value of the item of architectural state stored in that cache entry no longer corresponds with the value of that item of architectural state as stored within the relevant register, or if it is determined that that item of architectural state is no longer required by the functional unit having that register cache associated therewith.

Some other situations in which it may be decided to reset the valid field are as follows. If updates to the relevant register are captured in the cached entry but not in the register file, then at some point it may be decided to flush the contents of the register cache back to the register file, and invalidate the register cache by resetting the valid fields. Further, if the system includes two register caches which wish to store a copy of the contents of the same register, but it is desired to only allow one register cache to have a copy at a time in order to ease data management, then the resetting of the valid field in the relevant entry of one of the register caches can be used to achieve this. As another example, if the performance of the system is being degraded by the use of the content of a particular register cache entry, for example if those contents are being used to perform some prediction and the predictions made are proving to be inaccurate, hardware may detect this condition and cause the valid bit to be reset for the relevant register cache entry, thereby stopping the use of that register cache entry.

The valid field may take a variety of forms, but in one embodiment is a single bit field, which for example can be set to a logic one value to indicate a valid entry, and reset to a logic zero value to indicate an invalid entry.

In one embodiment, a predetermined number of access ports are provided for said plurality of registers, said predetermined number of access ports being shared by the plurality of functional units, whereby if an item of architectural state is available in the register cache associated with a particular one of said functional units, that functional unit can access that item of architectural state from the register cache without use of one of said access ports.

It will not always be the case that the functional unit will access the item of architectural state from the register cache as a direct result of determining that that item is available in the register cache, since for example in some embodiments there may be a pending update to that item of architectural state as stored in the register cache to bring it up-to-date with the value of that item as stored in the corresponding register, and in some embodiments this will result in the functional unit deciding to await the update before reading the item of architectural state from the register cache, or indeed to act as though no match has been found in the register cache, and act accordingly. As an example of this latter type of functionality, if the functional unit in question is a prefetch unit, and the register cache is used to cache copies of data from the register or registers used to derive target addresses for indirect branch instructions, then if the prefetch unit determines that a data value required to determine the target address is available in the register cache, but is awaiting a pending update, the prefetch unit may decide not to perform a prediction of the target address for that indirect branch instruction, rather than introduce any delay awaiting the update to take place. The unpredicted branch will then be handled later when the instruction is executed by the processor.

Whilst the present invention facilitates a reduction in the demand on the access ports in situations where a functional unit is able to obtain required items of architectural state directly from the register cache, thereby freeing up the access port resource for use by other functional units, the present invention can also be useful even in implementations where there is no perceived problem with regards to the demand on the access ports, for example where sufficient access ports are provided to avoid conflict of demand for the access ports by multiple functional units. For example, in some implementations where there are a significant number of functional units sharing the plurality of registers, or the size of the data processing apparatus is large, the actual physical path length between the access ports of the registers and a particular functional unit may be relatively long, resulting in a noticeable time delay in obtaining data from the registers, or writing data back to the registers. In such situations, the use of a register cache within such a functional unit can significantly reduce that performance hit in situations where items of architectural state frequently required by that functional unit are cached locally within the register cache.

It will be appreciated that the access ports may take the form of write ports for writing data to the registers, or read ports for reading data from the registers. Whilst the present invention can be used to reduce the demand on either type of access port, it has been found that it is often the read ports that suffer the greatest demands, and accordingly in one embodiment of the present invention, the register cache is used to store copies of items of architectural state that the associated functional unit often needs to read from the registers, thereby alleviating the demand on the read ports.

In embodiments of the present invention, each functional unit is operable to perform its processing operation in order to process an instruction to be handled by that functional unit and specifying as operand data one or more of said plurality of registers, the data processing apparatus further comprising: comparison logic, operable when said at least one of said functional units is to perform its processing operation, to compare the operand data of the instruction with the register identifier of each cache entry in the associated register cache to determine whether any item of architectural state required by said processing operation is available in the register cache.

In one embodiment of the present invention, the data processing apparatus further comprises update logic operable, when the value of an item of architectural state is changed in the plurality of registers, to update any copy of that item of architectural state within said register cache.

Hence, in accordance with this embodiment, the cached version of the item of architectural state will always be kept up-to-date with the version in the corresponding register of the register file, although there may be a period when the update is pending.

In accordance with embodiments of the present invention, two modes of operation are envisaged. In one mode, referred to herein as the precise mode, the control logic of the register cache is aware of whether each entry in the register cache is valid, and whether that entry is current or instead is awaiting an update, and only current data is allowed to be accessed in the register cache.

In one embodiment employing the precise mode, if an update is pending to a particular entry in the register cache that the comparison logic has determined contains an item of architectural state required by said processing operation, the functional unit is operable to await the update of that particular entry, and to then access that item of architectural state in the register cache.

As an example, if the functional unit is a multiply-accumulate unit, and the register cache contains as an item of architectural state the value of a register containing the accumulate value, then if for example an arithmetic logic unit is performing an update to that register, and accordingly a pending update is awaited to the corresponding entry in the register cache, then the multiply-accumulate unit may be arranged to stall pending the update to the register cache entry. In one embodiment, the control logic is responsible for managing this update process. For example, as updates are retired to the register file, the control logic can be arranged to cause those updates to also take place in the appropriate cache entries of the register cache.

In an alternative embodiment using the precise mode, if an update is pending to a particular entry in the register cache that the comparison logic has determined contains an item of architectural state required by said processing operation, the fictional unit is operable to determine that the item of architectural state is not available from the register cache, and to perform the processing operation without accessing that item of architectural state in the register cache. Hence, as an example, if the functional unit is a prefetch unit used to predict the target address for an indirect branch instruction, and the register cache is used to store copies of data from the register or registers that can be used to derive the target address, then the prefetch unit may be arranged in the event that a pending update is identified with respect to the relevant entry of the register cache to determine that no prediction of the target address can be performed (i.e. the result of the prediction process is that no prediction is generated), rather than delaying making a prediction until the update has taken place. As another example, considering the earlier example of a multiply-accumulate unit, if this form of the precise mode were used, the multiple accumulate unit could be arranged, in the event that there is a pending update to the relevant entry of the register cache, to instead obtain the accumulate value directly from the register rather than await the pending update to the register cache (assuming that there is some delay between updating of the register and updating of the register cache).

As an alternative to the precise mode of operation, a second mode of operation, referred to herein as an imprecise mode, may also be used. In the imprecise mode, if the comparison logic determines that a particular entry in the register cache contains an item of architectural state required by said processing operation, the functional unit is operable to access that item of architectural state in the register cache, and the data processing apparatus further comprises: analysis logic operable to subsequently determine whether the value of that item of architectural state accessed in the register cache corresponds to the value of that item of architectural state as stored in the relevant register, and to cause corrective action to be taken in the event that there is not correspondence between the values.

Hence, in accordance with this embodiment, even if update logic is provided to update the contents of the register cache, no attempt is made to determine whether the content of the register cache is still up-to-date with regards to the content of the corresponding register at the time the register cache entry is read (or if the control logic is aware that an update is pending, no account of that is taken), and instead reliance is made upon logic elsewhere within the data processing apparatus to later determine any discrepancy and to cause corrective action to be taken. For example, if the functional unit is a prefetch unit used to predict the target address for an indirect branch instruction, then later on when that indirect branch instruction is actually being executed within the data processing apparatus, a determination of the actual target address will ultimately be made, with reference to the actual value(s) stored in the relevant register(s), and accordingly a comparison can be made between the predicted target address and the actual target address. In the event that the two values do not correspond, the execution pipeline can be arranged to issue a mispredict signal to cause any pending instructions in the execution pipeline and any buffered instructions in the prefetch unit to be flushed, and for the next instruction to be retrieved from the actual target address for execution within the data processing apparatus. Hence, in such an embodiment, the actual mechanisms used to cause corrective action to be taken are already provided, and all that is required is to provide some analysis logic to compare the predicted target address with the actual target address and to cause the corrective action to be triggered in the event that the values do not correspond.

There are a number of ways in which the control logic can determine which subset of items of architectural state to be copied into the register cache. In one embodiment, the control logic is operable to analyse the operand data of each instruction to be handled by the relevant functional unit in order to determine the subset of items of architectural state to be copied into the register cache for that functional unit. As an example, a load-store unit may be used to generate addresses by combining a base address specified in a particular register with an immediate value specified within each instruction. The same base address may be used for multiple such address generations, and accordingly the control logic could be arranged to determine from the operands which register is being used to store the base address, and to cause the contents of that register to be cached within the register cache.

As a similar example, if the functional unit is a multiply-accumulate unit, then it is typically the case that a register is specified as both a source operand for the accumulate value input to the multiply-accumulate unit, and as the destination operand for the resulting accumulate output by the multiply-accumulate unit. In this example, the control logic can be used to determine from the operands specified by each instruction which register is being used to store the accumulate value, and to cause the contents of that accumulate register to be cached. In such an embodiment, each time a new accumulate value is generated after each iteration of the multiply-accumulate operation, the value in the register cache may be updated directly by the multiply-accumulate unit to ensure that the register cache then stores the correct value required for the next iteration of the multiply-accumulate operation.

In an alternative embodiment, the control logic is operable to receive control signals generated by software executing on the data processing apparatus identifying, for a particular functional unit having a register cache associated therewith, the subset of said items of architectural state to be copied in said register cache. Hence, in this embodiment, rather than the control logic determining from the operand data of each instruction which subset of items of architectural state to be copied, control signals are generated to instruct the control logic which subset items of architectural state are to be copied in the register cache. For example, in the flow of instructions, an instruction could be arranged to generate a control signal to the control logic instructing it to copy into the register cache of a load-store unit the contents of a particular register that the software knows will be used as a base address for a subsequent operation to be executed on that load-store unit, such that when that subsequent operation is to be executed, the value required is already cached within the register cache, and hence does not need to be read from the register bank via a read port.

In one embodiment, if the performance of said processing operation by said at least one of said functional units results in the generation of an updated value for an item of architectural state stored in a cache entry of the associated register cache, then that functional unit is operable to cause that cache entry to be updated with the updated value. This ensures that the updated value is accessible directly from the register cache the next time it is required by the functional unit.

At the same time as updating the value within the register cache, the functional unit may also output an update signal to a write port associated with the plurality of registers, to cause the value in the relevant register to be updated. This ensures that if another functional unit requires access to that register, the up-to-date value will be stored in the register. However, in an alternative embodiment, the update of the cache entry within the register cache is performed without causing the value in the relevant register to be updated and the control logic is operable to record that the value in that relevant register is not the most recent value, the control logic further being arranged if an access to that relevant register is requested by one of said functional units, to cause the updated value to be output from that cache entry for storage in the relevant register.

In situations where a particular register is often used by only one of the functional units, such an approach can significantly reduce power consumption that would otherwise be employed in updating the register each time the value is updated. If an access to that register is requested, then the control logic can cause the updated value to be output from the cache entry for storage in the relevant register. This would also typically occur if the functional unit having that cache entry associated therewith determines that it no longer requires the item of architectural state contained within that entry, to ensure that the most up-to-date value is written back to the relevant register before that information is removed from the register cache.

It will be appreciated that the register cache can take a variety of forms. However, it has been found that the register cache can typically be formed by a fully associative cache, which provides a small and simple cache structure for situations where there are only a relatively few number of cache entries.

In one embodiment, the at least one of said functional units comprises a prefetch unit, the processing operation is a branch prediction operation for an indirect branch instruction, and the subset of said items of architectural state to be copied in said register cache comprises the value of one or more registers within said plurality of registers operable to store data from which a target address can be derived.

Typically, whilst it is known to provide prefetch units with prediction logic which can predict the target address for direct branch instructions (i.e. branch instructions where the target address is specified directly within the branch instruction with reference to the program counter (PC) value), it has not typically been possible for a prefetch unit to perform predictions for indirect branch instructions (i.e. branch instructions where the target address is specified with reference to the contents of one or more registers), since the prefetch unit will not typically have access to those registers. Whilst it would be possible in principle to provide a dedicated read port for the prefetch unit to enable it to read the required register contents to enable it to predict a target address, such an approach would typically be considered to be too costly, since as discussed earlier, each additional read port has an associated cost in terms of gate count, area and signal loading. Hence, typically no prediction of the target address for an indirect branch instruction has been performed by a prefetch unit. However, in accordance with one embodiment of the present invention, a register cache can be provided within the prefetch unit for storing the values of certain registers that have previously been used by indirect branch instructions, such that if further indirect branches using the cached register occur, the prefetch unit is able to perform a prediction of the target address using that cached data. This enables an enhanced prediction functionality to be provided within the prefetch unit.

In one embodiment, the prefetch unit is operable to issue an instruction address for an instruction to be prefetched, the prefetch logic further comprising a tagged lookup structure for storing for a number of instruction addresses an indication as to whether the instruction at that instruction address is an indirect branch instruction and the one or more source registers for that instruction, the prefetch unit being operable to reference that tagged lookup structure for each issued instruction address, and in the event that that issued instruction address is identified in the lookup structure as being the instruction address of an indirect branch instruction, to cause the register cache to be referenced to determine if it contains an entry for any of the one or more source registers. This provides an efficient technique for seeking to predict target addresses for indirect branch instructions using the instruction addresses issued for instructions being prefetched.

It will be appreciated that the prefetch unit will typically be arranged to issue an instruction address for each instruction or group of instructions.

In addition to the above approach, or as an alternative to the above approach, the prefetch unit may further comprise decode logic operable to determine for each prefetched instruction whether that prefetched instruction is an indirect branch instruction, and if so what the one or more source registers for that prefetched instruction are, and in the event that that prefetched instruction is an indirect branch instruction, to cause the register cache to be referenced to determine if it contains an entry for any of the one or more source registers.

This decode logic will typically be some preliminary decode logic internal to the prefetch unit, that is separate to the decode logic provided elsewhere in the data processing apparatus for decoding instructions output by the prefetch unit.

An indirect branch instruction may specify the target address as being the content of one particular register, or alternatively may specify one or more registers whose contents are to be used to derive the target address. If the target address is specified directly within a particular register, then if there is a hit within the register cache, that value can be read from the register cache and provided directly to the logic within the prefetch unit used to issue instruction addresses for instructions to be prefetched. However, if the target address needs to be derived from the contents of one or more entries in the register cache, then the prefetch unit preferably further comprises address generation logic operable, if that data from which the target address can be derived is copied in the register cache, to generate a predicted target address from that data as retrieved from the register cache.

In one embodiment, the data processing apparatus further comprises analysis logic operable to subsequently determine whether the predicted target address corresponds to the actual target address derived from the data in said one or more registers within said plurality of registers, and to cause corrective action to be taken in the event that there is not correspondence between the predicted target address and the actual target address. The logic required to take corrective action will typically already be provided within the data processing apparatus, since it will have been required to deal with any other mispredictions that may have been made by the prefetch unit, for example mispredictions of direct branch instructions. Hence, the analysis logic merely needs to determine whether the predicted target address corresponds to the actual target address, and if not to invoke such corrective mechanisms.

In an alternative embodiment, the at least one of the functional units comprises a multiply-accumulate unit, the processing operation is a multiply-accumulate operation, and the subset of said items of architectural state to be copied in said register cache comprises the value of a register within said plurality of registers operable to store an accumulate value. Typically, this value within the register cache will be updated by the multiply-accumulate unit each time the multiply-accumulate operation is performed.

In an alternative embodiment, the at least one of the functional units comprises a load/store unit, the processing operation is an address generation operation, and the subset of said items of architectural state to be copied in said register cache comprises the value of one or more registers within said plurality of registers operable to store source data for said address generation operation. As an example, load/store units are often used to generate an address by adding an immediate value to a base address, and the base address is often reused multiple times. In such embodiments, the source data may comprise the base address, with a copy of that base address data being stored locally within the register cache.

In an alternative embodiment, the at least one of the functional units comprises a prefetch unit, the processing operation is a predicted address generation operation for a load operation, and the subset of said items of architectural state to be copied in said register cache comprises the value of one or more registers within said plurality of registers operable to store source data for said predicted address generation operation. As mentioned previously, the prefetch unit has not typically been provided with a dedicated read port to the registers, as this was considered too costly. However, by storing within a local register cache the values of registers previously used in such address generation operations, the prefetch unit is then able to perform some predicted address generation for such address generation operations, and that predicted address may for example be used to access a data cache to obtain the data at that predicted address. When that address generation operation is subsequently executed within the data processing apparatus, then if the prediction proves correct this can significantly increase the processing speed since the data cache will have already been accessed, and hence does not need accessing again at that stage. Again, a typical example of the source data that may be cached locally is a base address value.

It will be appreciated that the plurality of registers can take a variety of forms. However, in one embodiment, the plurality of registers are general purpose registers used to store items of architectural state used by various functional units within the data processing apparatus.

Viewed from a second aspect, the present invention provides a method of accessing items of architectural state within a data processing apparatus comprising a plurality of registers operable to store said items of architectural state, and a plurality of functional units, each functional unit being operable to perform a processing operation with reference to one or more of said items of architectural state, the method comprising: for at least one of said functional units, providing a register cache associated therewith having one or more cache entries; determining a subset of said items of architectural state to be copied in said register cache in dependence on the processing operation of the functional unit with which said register cache is associated; and storing within each cache entry a copy of one of said items of architectural state within the subset and a register identifier identifying the register containing that item of architectural state.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
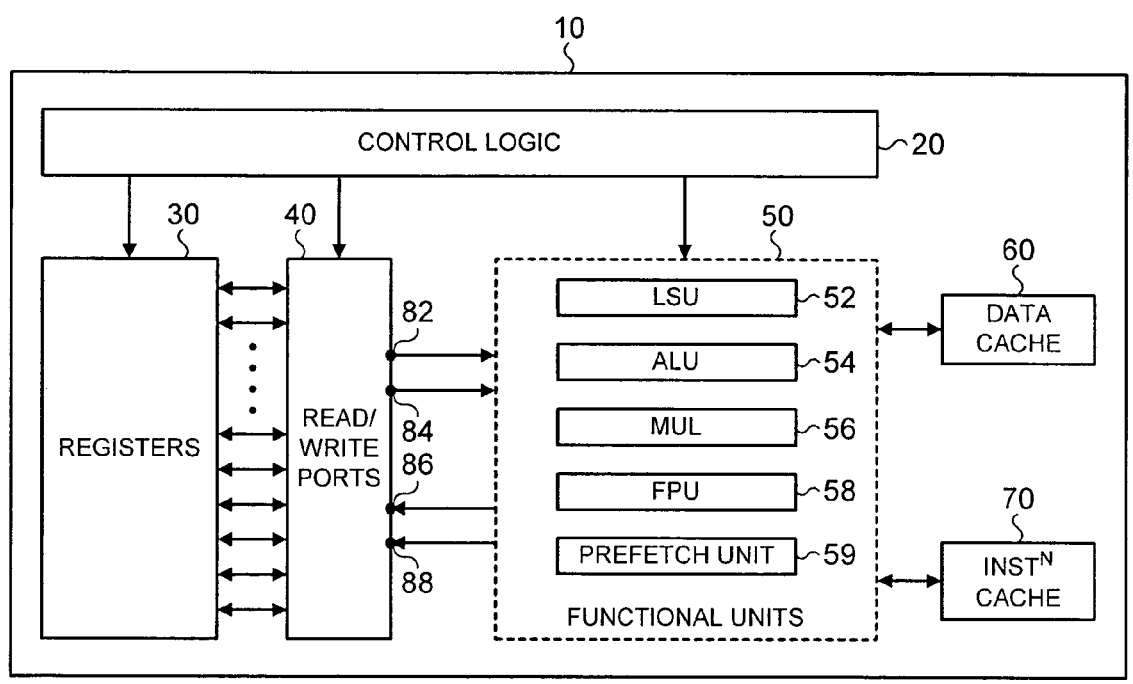
FIG. 1 is a block diagram illustrating a data processing apparatus in which embodiments of the present invention may be employed.

FIG. 1 is a schematic block diagram of a data processing apparatus in which embodiments of the present invention may be employed. The data processing apparatus 10 includes a number of functional units 50, in the particular example of FIG. 1 these functional units comprising a load-store unit 52, an arithmetic logic unit 54, a multiplier logic unit 56, a floating point unit 58 and a prefetch unit 59. An instruction cache 70 is provided for storing instructions required by the various functional units 50. In the event that a required instruction is not present within the instruction cache 70, then the instruction cache 70 will typically be arranged to issue a memory request to an external memory containing the required instruction, and to return the instruction to the required functional unit when retrieved from the external memory.

A register bank 30 is provided for storing data values to be manipulated by the instructions executed on the functional units 50. Load instructions may be used to load data values into the register bank 30 from the data cache 60, and store instructions may be used to store data values into the data cache 60 from the register bank 30. In a similar manner to the operation of the instruction cache, the data cache 60 will be arranged such that, in the event that the data value to be accessed is not present in the data cache, an access request will be issued to external memory in order to access that data value.

When any of the functional units 50 are to execute an instruction, they will typically obtain the required operand data values from the register bank 30 via an appropriate read port within the access ports 40. Similarly, any data value generated as a result of execution of that instruction will typically be written back to a destination register within the register bank 30 via an appropriate write port within the access ports 40. In the example illustrated in FIG. 1, two read ports 82, 84 are shown and two write ports 86, 88 are shown, and these read and write ports are shared amongst the various functional units 50. It will be appreciated that different implementations may include different numbers of read and/or write ports, and indeed there is no requirement for the number of read ports and write ports to be the same.

As mentioned earlier, the increase in complexity in data processing apparatus is increasing the demand placed on the access ports 40, and particularly the read ports, associated with the register bank 30. In particular, as the instruction issue rate of a operand(s) to be available promptly, and this places increasing demands on the availability of read ports. Embodiments of the present invention are aimed at alleviating this demand on the read ports, and will be described in more detail with reference to the remaining drawings.

Figure 2:
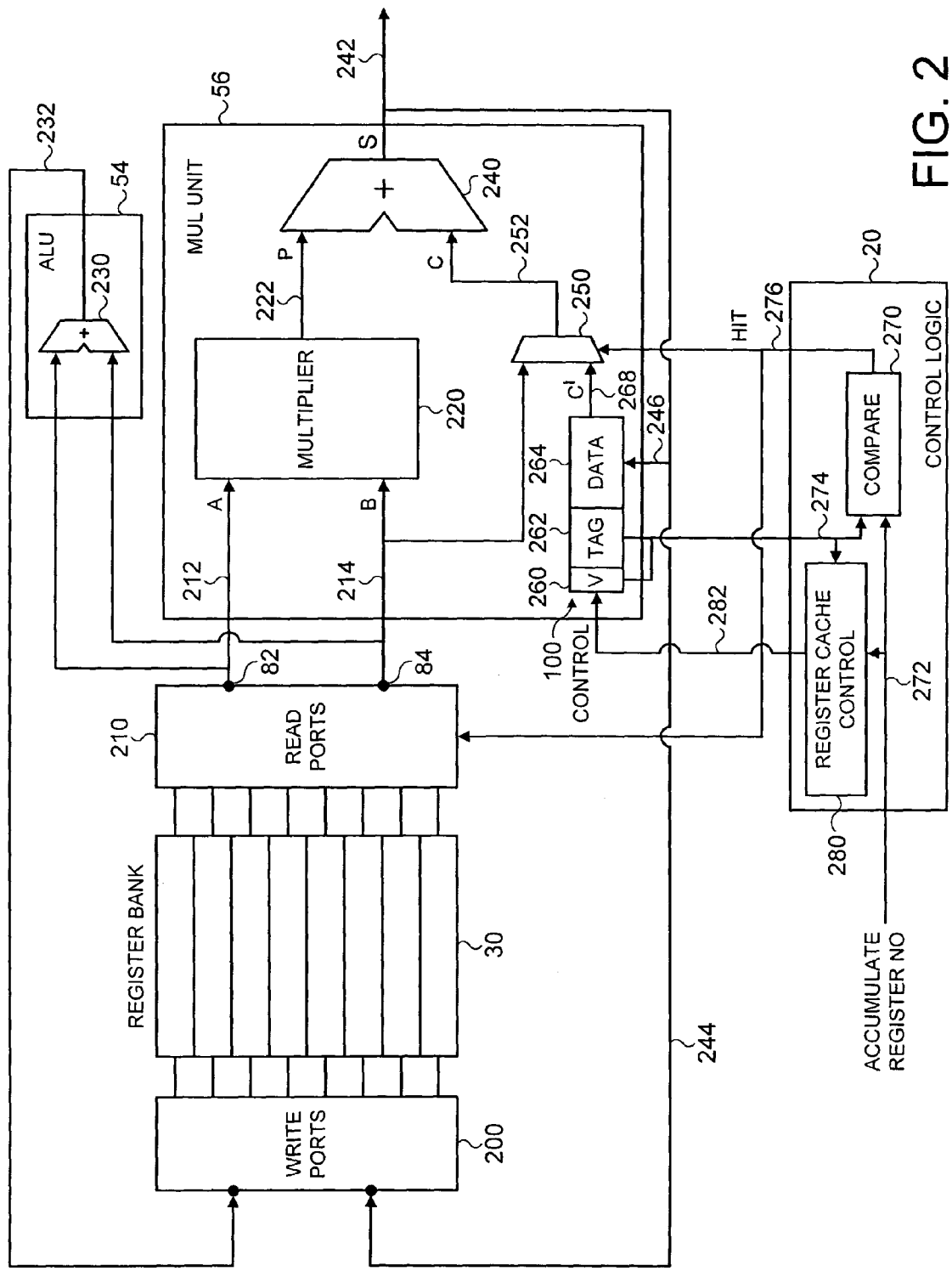
FIG. 2 is a block diagram illustrating one embodiment of the present invention.

FIG. 2 illustrates one embodiment of the present invention in which the multiplier unit 56 is provided with a register cache 100 having one or more cache entries for storing copies of items of architectural state contained within the register bank 30, with the aim of reducing the demand on the read ports 210 associated with the register bank. The multiplier unit 56 is arranged to perform operations of the type (A×B)+C, in order to produce an accumulate result. The destination register for the result is typically the same as the source register containing the "C" operand, such that on each iteration of the operation the accumulate value is updated and returned to the relevant register in the register bank. Hence, for each iteration of a multiply-accumulate operation within a multiplier unit 56, three source operands are required, namely the values of A, B and C, these values typically being stored within three registers of the register bank 30.

If the read ports 210 consist of two read ports 82 and 84, then this typically means that two cycles are required to read in the required operands to the multiplier unit 56. For example, in a first cycle, the operands A and B can be read via the read ports 82, 84 over paths 212, 214, respectively, into the multiplier 220, so that the multiplier 220 can then multiple the operands A and B together in order to produce the product P over path 222. In the next cycle, the C operand can be read via read port 84 over path 214 for inputting to the adder logic 240, where the operand C can be added to the product P to produce the accumulate value S for outputting over path 242. However, since one of the read ports needs to be accessed by the multiplier unit 56 in the second cycle, that read port is not available for use at that time by any of the other functional units within the data processing apparatus, for example the ALU 54.

However, with the embodiment of the present invention illustrated in FIG. 2, whereby a register cache 100 is incorporated within the multiply unit 56, the read ports 210 can be freed up for use by another functional unit one cycle earlier than would otherwise be possible, as will be discussed in more detail below. The control logic 20 includes register cache control logic 280 which is arranged to monitor the operands of instructions being executed by the multiplier unit 56 in order to determine which register number is being used to hold the accumulate data value. When the accumulate register number has been identified by the register cache control logic 280, it sends a control signal over path 282 to the register cache 100 to cause the register cache to set a valid bit 260 within a cache entry of the register cache, and also to store within a tag portion 262 of that cache entry an identification of the register number containing the accumulate value. Then, when the accumulate value is output from the adder 240 and routed back over path 244 to one of the write ports 200 for storage of that accumulate value within the destination register of the register bank, that accumulate value is also routed over path 246 into the data portion 264 of the relevant cache entry.

The next time that a multiply-accumulate instruction is issued to the multiply unit 56, compare logic 270 within the control logic 20 will compare the tag value 262 within the register cache output over path 274 (assuming the corresponding valid bit 260 indicates that the tag value is valid) with the accumulate register number specified within the instruction and received over path 272. In the event of a match, a hit signal is then output over path 276 to the multiplexer 250 to cause the multiplexer 250 to output over path 252 at the appropriate time the operand C', i.e. the accumulate value stored within the data portion 264 of the register cache entry. Again, when the result is generated it is returned not only to the register bank 30, but also to the register cache over path 246.

Preferably, the comparison performed by the compare logic 270 is done sufficiently in advance that the hit signal can also be routed to the read ports 210 to indicate that only the A operand and B operand need be read from the register bank 30. As a result of this, the read ports 210 will become available to other functional units, for example the ALU 54 containing the adder 230, one cycle earlier than would otherwise be the case, and this in illustrated by way of example with reference to FIGS. 3A and 3B.

Figure 3A:
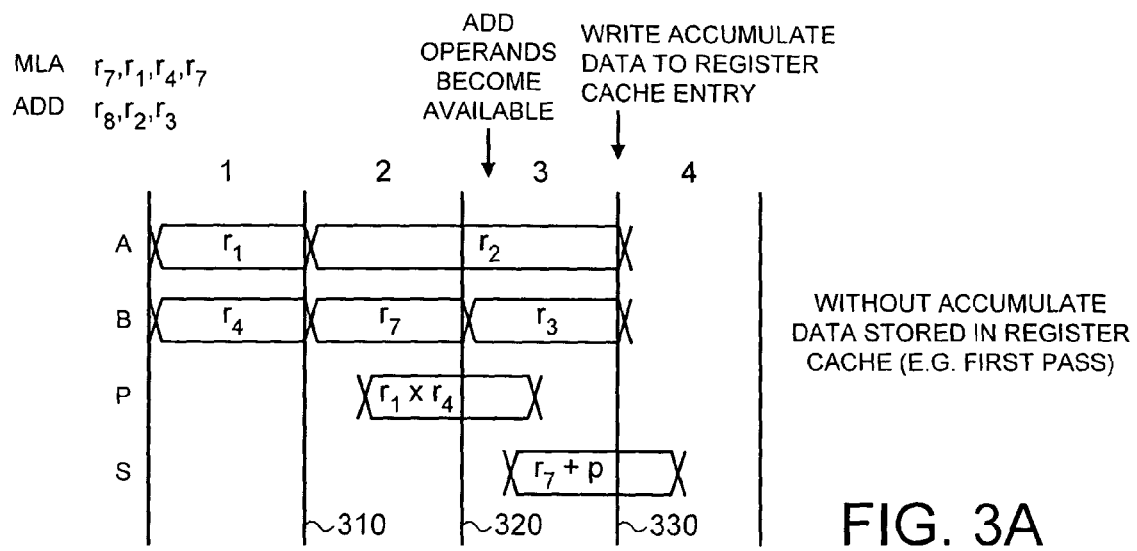
FIGS. 3A and 3B are timing diagrams illustrating operation of the logic of FIG. 2.
Figure 3B:
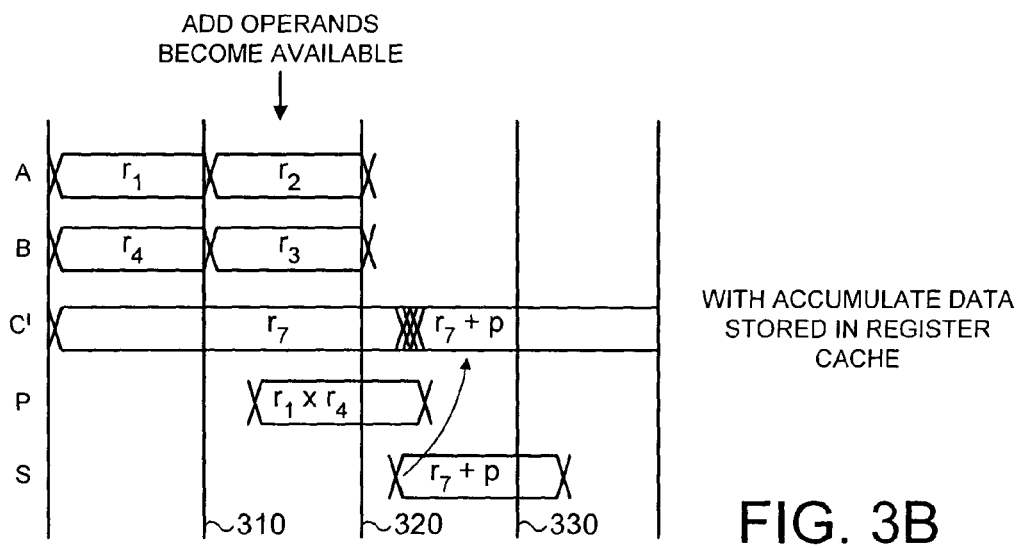

In the examples of FIGS. 3A and 3B, it is assumed that the following two instructions are to be executed:
MLA $r_7$, $r_1$, $r_4$, $r_7$
ADD $r_8$, $r_2$, $r_3$ FIG. 3A illustrates the situation where the accumulate data is not stored in the register cache 100, as for example would be the case on the first iteration of the multiply-accumulate instruction (and indeed would be the case if no register cache 100 were provided within the multiplier unit 56). In a first cycle, the source operands $r_1$, and $r_4$ are read via read ports 82 and 84, these values typically being read by the multiplier unit 56 at the end 310 of the first clock cycle. In the second cycle, the accumulate value $r_7$ is read via the read port 84, and sampled by the multiplier unit 56 at the end 320 of the second clock cycle. During this second clock cycle, the multiplier 220 may typically perform the multiplication of the values $r_1$ and $r_4$, and accordingly at the end 320 of the second clock cycle the adder 240 may be provided with the product value P and the accumulate value C (i.e. the value $r_7$).

During the third cycle, the adder 240 within the multiplier unit 56 will calculate the accumulate value $r_7$+P, with this value being written back to the register cache entry 264 over path 246 at the end 330 of the third clock cycle.

During the second cycle, the source operand $r_2$ for the add instruction may be output via the read port 82 but the second required operand $r_3$ will not be able to be output until the third cycle, and hence typically the $r_2$ operand will continue to be asserted through the third cycle so that the adder 230 within the ALU 54 can sample $r_2$ and $r_3$ at the same time, i.e. at the end 330 of the third clock cycle. Hence it can be seen from FIG. 3A that the source operands for the add instruction only become available during the third cycle.

During the subsequent iteration of the multiply-accumulate instruction, the operands $r_1$ and $r_4$ can again be read during a first clock cycle, and now the current accumulate value C' will also be available during the first cycle from the relevant cache entry of the register cache 100. The multiply-accumulate operation proceeds exactly as it did in FIG. 3A, with the multiplication being performed in the second cycle, and the accumulate being performed in the third cycle. Also, as also illustrated in FIG. 3B, the value of C' stored in the register cache 100 is updated during the third cycle to reflect the new accumulate value $r_7$+P when that value is written back over path 246 to the relevant data portion 264 in the register cache 100. This transparent behaviour of the C' value then allows back-to-back single cycle multiply-accumulate behaviour if required, since the new source operands A and B (in this example $r_1$ and $r_4$) can be read each cycle.

In addition, even if back-to-back multiply-accumulate behaviour is not required, and instead other instructions are to be executed between each multiply-accumulate instruction, for example the add instruction illustrated in FIGS. 3A and 3B, the presence of the register cache 100 within the multiplier unit 56 has alleviated the demand on the read ports, thereby allowing both of the operands $r_2$ and $r_3$ required by the subsequent add instruction to be available one cycle earlier, i.e. at the end of the second cycle, thereby allowing the add instruction to be performed within the ALU 54 one cycle earlier than would otherwise be possible.

In FIG. 2, it is assumed that each time an accumulate value is produced, it is returned to the relevant destination register of the register bank 30 via an appropriate write port 200 over path 244, in addition to being written back to the relevant data portion 264 of the register cache entry. However, as will be described in more detail with reference to some of the later examples described herein, it is also possible for the updated accumulate value only to be written back to the data portion 264 at the end of each accumulate operation, and not automatically written back to the destination register of the register bank each time. In this embodiment, the control logic 20 is arranged to keep track of those registers within the register bank that do not contain the most up-to-date version of the associated data value, in this example noting that the destination register for the accumulate value does not store the most up-to-date accumulate value. Then, if any other functional unit requires access to that register, the control logic is arranged to cause the register cache 100 within the multiplier unit 56 to output the required data value to the register bank to cause the destination register to be updated prior to that data value being accessed by the other functional unit.

Additionally, the control logic 20 may be arranged to generate control signals for the write and read ports 200, 210 of the register bank 30, and accordingly it will be aware of all operations that write to a register. Hence, if some other functional unit is to write an updated value to a register within the register bank, this will be noted by the control logic 20, and the register cache control logic 280 will be arranged to compare the register number of the register being written to with the register number stored in the cache entry of the register cache 100 (as output over path 274). If a hit is detected (i.e. the register being updated is the accumulate register), the register cache control logic 280 is preferably arranged to cause the valid flag 260 to be reset to indicate that the data value contained within the register cache is no longer valid, whereafter the next time the multiply-accumulate operation is to be performed the accumulate value will be read from the accumulate register within the register bank 30. By this approach, a precise mode of operation of the multiplier unit 56 is used, in which the multiplier unit 56 can be sure that the data value stored within the data portion 264 of a register cache entry is the most up-to-date value if its associated valid bit 260 is set.

Figure 4:
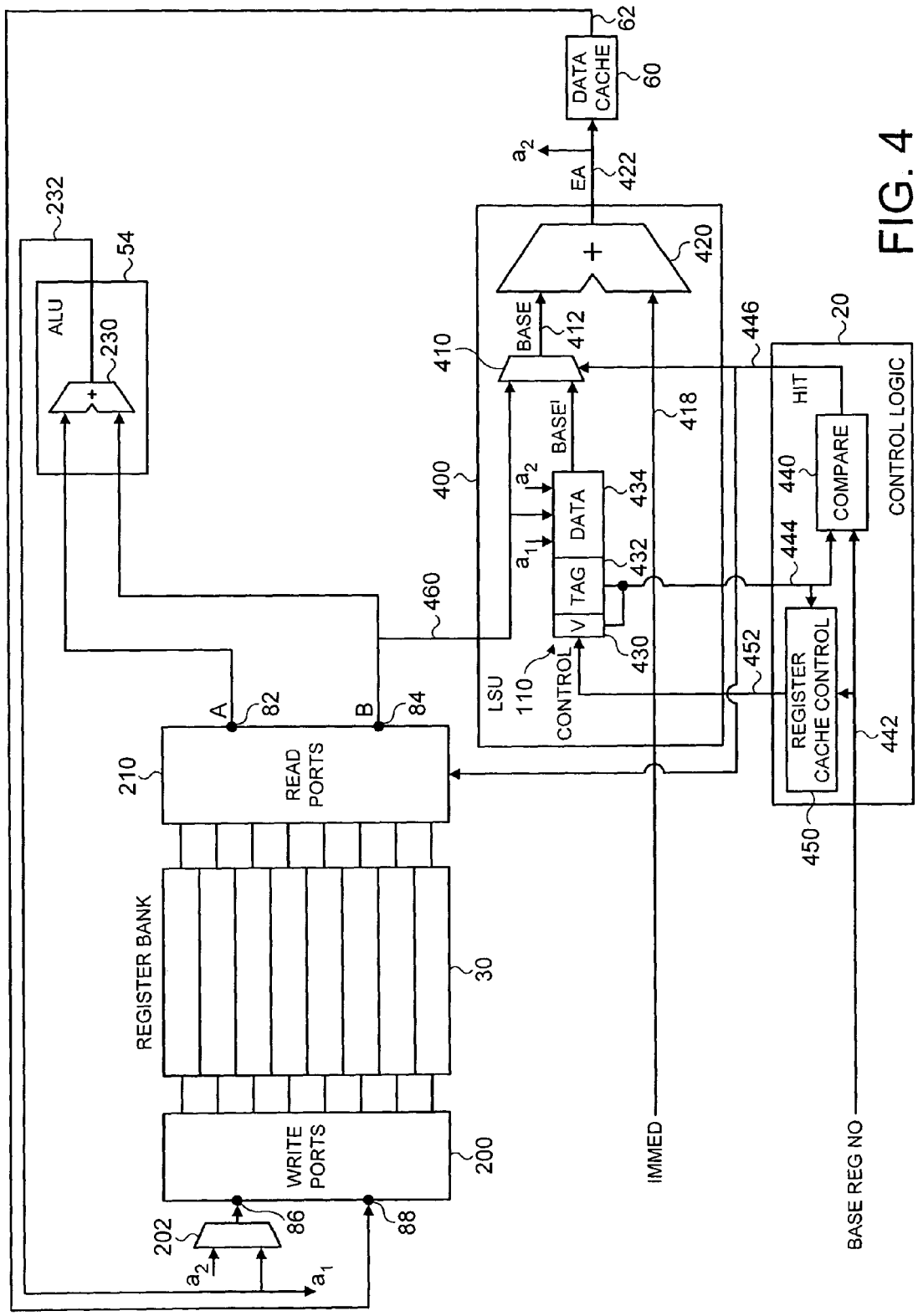
FIG. 4 is a block diagram illustrating another embodiment of the present invention.

FIG. 4 illustrates an alternative embodiment of the present invention in which a register cache 110 is provided within a load-store unit (LSU) 400 for storing a base address used by the LSU 400 in the generation of an effective address (EA) for a load operation. More particularly, a load instruction may specify a register containing a base address, and further may specify an immediate value to be added to the base address in order to identify an address from which a data value should be loaded from the data cache 60. Hence, the load instruction may be of the form:

LDR $r_d$, [$r_m$, #4]!

In this example, the register $r_m$ contains the base address, the immediate value is 4, and the data value obtained from the address generated by adding 4 to the contents of the register $r_m$ is then to be stored in the destination register $r_d$. In this particular example, the ! at the end of the load instruction indicates that the base address $r_m$ is to be updated to reflect the new effective address generated by adding 4 to the previous base address.

On a first iteration, the base address in register $r_m$ will be read from the read port 84 over path 460 and routed to the adder 420 within the LSU 400. The LSU 400 will also receive the immediate value specified within the load instruction over path 418, as a result of which the adder 420 will generate an effective address over path 422 which will be output to the data cache 60 to cause the required data value to be output over path 62 to a write port 88 associated with the register bank 30.

Prior to execution of that load instruction, the register cache control logic 450 within the control logic 20 may have determined the register number being used as the base address by analysis of the operands of the instruction, and in that event will have issued a control signal over path 452 to cause the register cache 110 to set a valid bit 430 within a cache entry of the register cache 110, and also to store within the tag portion 432 the register number. When the base address is then read over path 460, it will also be stored within the data portion 434 of the relevant cache entry, for use in a subsequent such load instruction using the same base address.

If the load instruction is of the type where the base address is incremented at the end of the instruction (i.e. the ! is provided at the end of the instruction), then the path $a_2$ is used to output the updated base address back to the relevant register $r_m$ via the multiplexer 202 and the write port 86, and in addition is used to update the data value within the data portion 434 of the register cache entry. However, if the load instruction is not of the type where the base address is incremented in such a manner, then the path $a_2$ is not used.

When the load instruction is later repeated, the compare logic 440 within the control logic 20 compares the tag value 432 from the register cache entry (assuming the corresponding valid bit 430 indicates that the tag value is valid) with the base register number provided within the instruction and routed over path 442 to the compare logic 440, and in the event that these two values match, a hit signal is output over path 446 to the multiplexer 410, to cause the multiplexer to select as the base value provided over path 412 the value BASE' stored within the data portion 434 of the register cache entry. In this instance, there is no need for the read port 84 to be used to read the base address from the source register $r_m$, and this fact may, for example, be indicated to the read ports 210 by routing of the hit signal over path 446 to the read ports 210. Alternatively, the logic may be arranged to route an earlier version of the hit signal to the read ports 210 one cycle earlier.

As shown in FIG. 4, the read ports 82 and 84 may also be shared with an ALU 54 containing an adder 230, and the results of any addition performed by that adder may be routed back over path 232 via multiplexer 202 to the write port 86 for storing in the required destination register. If the ALU specifies as the destination register the register $r_m$ cached within the register cache 110 of the LSU 400, there are a number of options available. As a first option, the register cache controller 450 could be arranged to identify such an occurrence, and to reset the valid bit 430 in the relevant register cache entry to show that the data within the corresponding data portion 434 is no longer valid. Then, when the base address is next required by the LSU 400, that base address will be obtained from the relevant base address register $r_m$ via the read port 84. As an alternative, the path $a_1$ can be provided such that when the value is written back to the register bank, it is also broadcast to the LSU 400 to enable the data value within the data portion 434 to be updated. Whilst this update is awaited, the control logic 20 can be arranged to indicate to the LSU 400 that an update is pending to the relevant entry of the register cache, to thereby stall any pending load instruction requiring this base address until the update has taken place. In any of the above described approaches, it will be appreciated that in instances where the LSU 400 is to use the data value stored within the data portion 434 of the register cache, that data value will be up-to-date, and accordingly a precise mode of operation is employed.

Figure 5A:
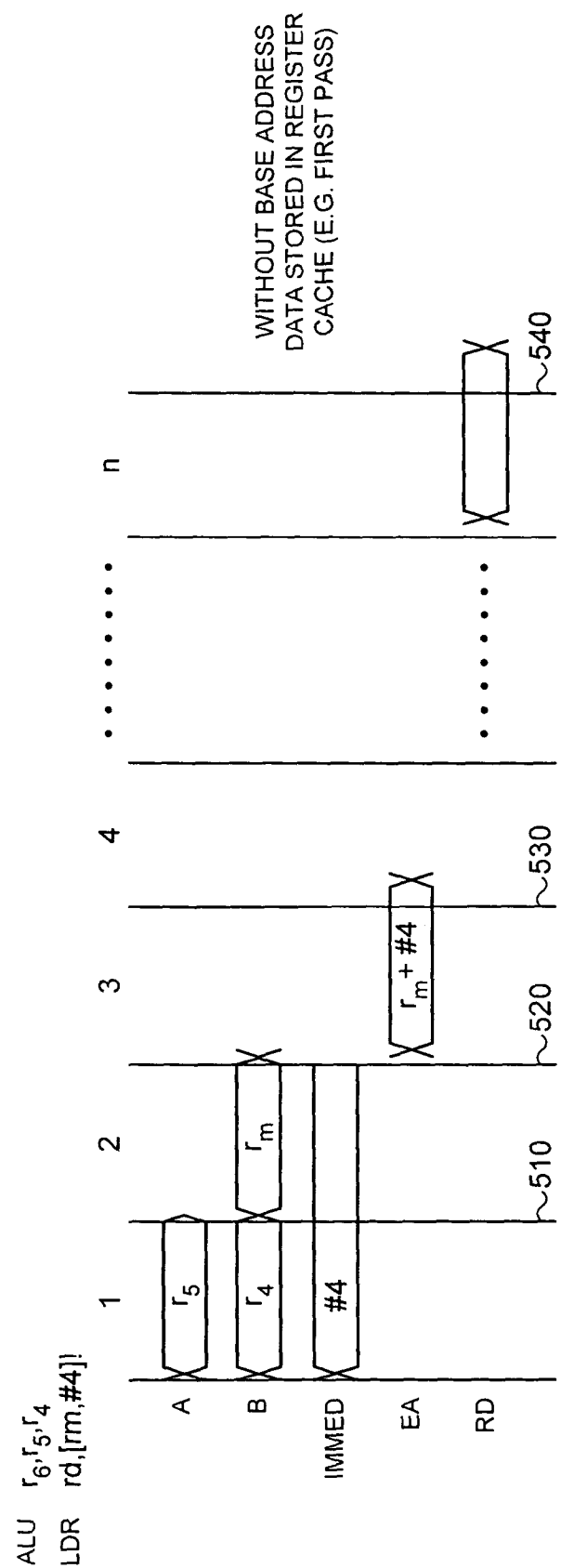
FIGS. 5A and 5B are timing diagrams illustrating operation of the logic of FIG. 4.
Figure 5B:
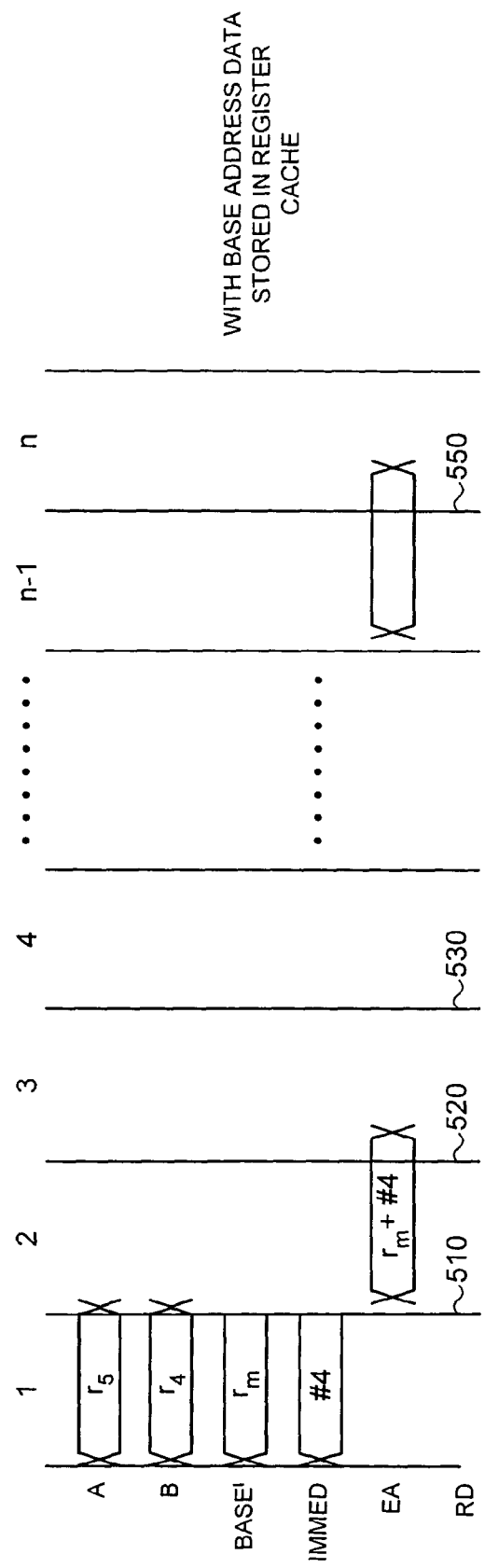

FIGS. 5A and 5B illustrate the timing involved in the execution of the following instruction sequence by the logic of FIG. 4:

ALU $r_6, r_5, r_4$
LDR $r_d, [r_m, \#4]!$

FIG. 5A illustrates the situation where the base address is not stored in the register cache 110, as for example would be the case on the first iteration of the load instruction (and indeed would be the case if no register cache 110 were provided within the LSU 400). The ALU 54 will in a first cycle receive the source operands $r_5$ and $r_4$ via read ports 82 and 84, and hence in the second cycle can continue with the add operation, with the result being stored within the destination register $r_6$.

Also in the first cycle, the LSU 400 may be arranged to receive the immediate value over path 418. However, it cannot read the source operand $r_m$ until the second cycle, when that value is output from the read port 84. Hence, it is only at the end 520 of the second cycle that the LSU 400 is able to read the values $r_m$ and the immediate value 4, and store the value of $r_m$ in the register cache 110. Then in the third cycle the computation $r_m+4$ is performed in order to produce the effective address, which is then output at the end 530 of the third clock cycle. This will result some cycles later in the data cache 60 outputting the required data RD which may then be sampled by the relevant write port at the end 540 of clock cycle n.

After the first iteration as illustrated in FIG. 5A, the required base address $r_m$ will now be stored within the data portion 434 of the register cache 110. Accordingly, as illustrated in FIG. 5B, on the next iteration of the instruction sequence, the source operands $r_5$ and $r_4$ required by the add instruction to be performed by the ALU 54 will again be provided via the read ports 82 and 84 during a first clock cycle. However, both the immediate value (in this example the value 4) and the base address $r_m$ will now be available to the LSU 400 in the first clock cycle without requiring any register bank access to take place, and accordingly the LSU 400 can proceed with the generation of the effective address in the second clock cycle, thereby resulting in the required data value being returned a cycle earlier (i.e. the cycle n−1) than would otherwise be the case, assuming the same pattern of intermediate activity between the generation of the effective address and the return of the data value RD. Hence, in this example, it can be seen that the provision of the register cache 110 alleviates the demand on the read ports, and allows the load instruction to proceed more quickly than would otherwise be required if the base address needed to be read from the relevant register of the register bank.

Figure 6A:
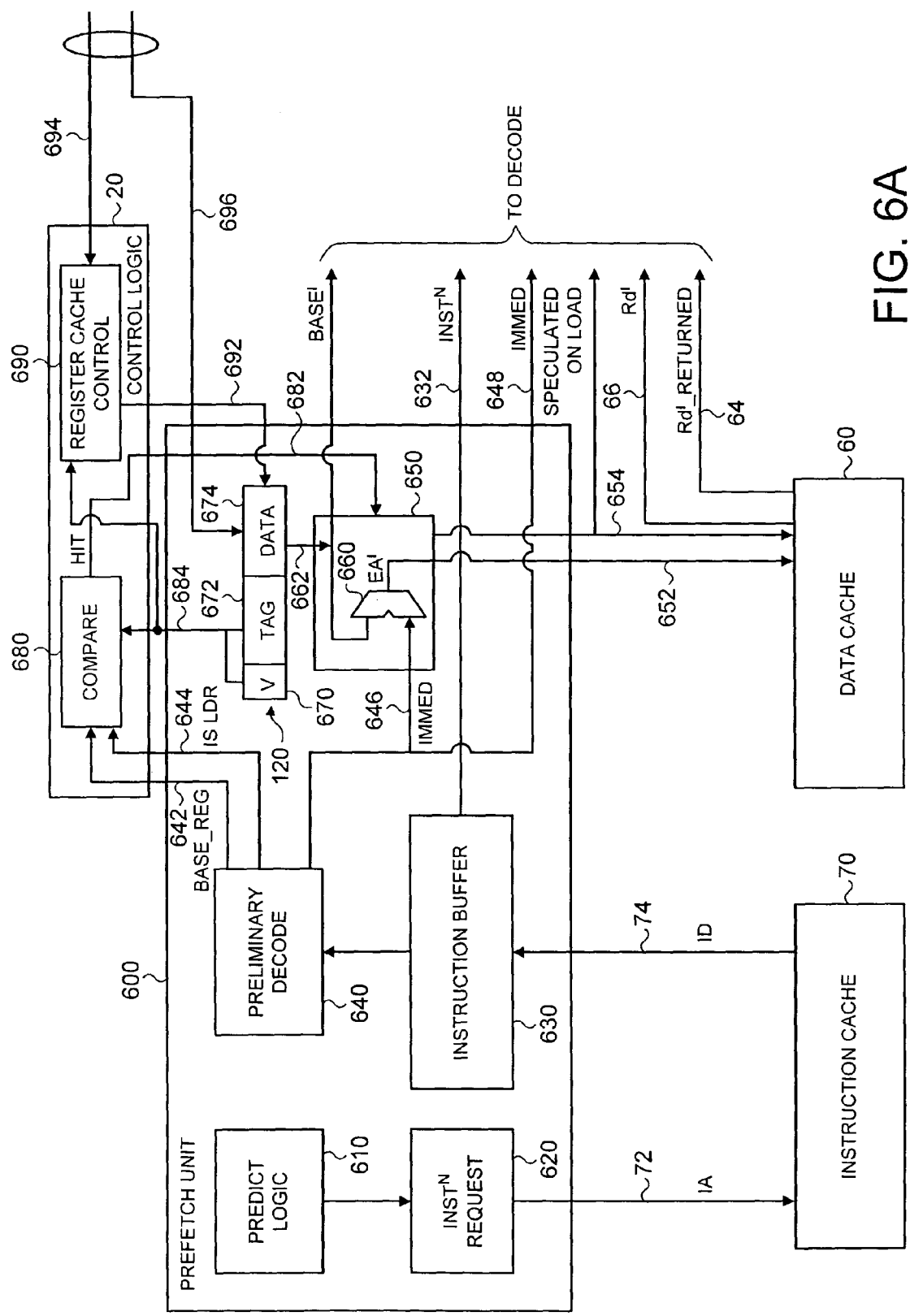
FIG. 6A is a block diagram illustrating another embodiment of the present invention.

FIG. 6A illustrates an alternative embodiment of the present invention, where logic 650 is provided within the prefetch unit 600 for use in combination with a register cache 120 to seek to predict effective addresses for load instructions during the prefetch operation. More particularly, as is illustrated in FIG. 6A, the prefetch unit 600 may comprise prediction logic 610 for predicting instructions required by the functional units 50, and to output those predictions to an instruction request logic 620 responsible for issuing instruction addresses for required instructions over path 72 to the instruction cache 70. As the instruction cache processes the instruction addresses, it will return the required instructions over path 74 to the instruction buffer 630 from where the instructions can then be output over path 632 to the decode stage of the required functional unit 50. As will be appreciated by those skilled in the art, all of the above functionality of the prefetch unit 600 is entirely standard.

However, in accordance with the illustrated embodiment of the present invention, the prefetch unit 600 also includes preliminary decode logic 640 for reviewing each instruction in the instruction buffer, and for each instruction determining whether that instruction is an "LDR" instruction (i.e. a load instruction), and if so an identification of the base register required for that LDR instruction. The indication as to whether the instruction is an LDR instruction is passed over path 644 to compare logic 680 within the control logic 20, whilst the indication of the base register is passed to the compare logic over path 642. If the instruction is an LDR instruction, the compare logic 680 is arranged to compare the base register indication received over path 642 with the tag value 672 within any valid cache entry of the register cache 120 obtained over path 684.

Initially, there will be no data stored within the register cache 120, and accordingly no hit will be generated by the compare logic 680, and instead the instruction will merely pass from the instruction buffer 630 down the core pipeline (through the decode stage, etc) to the relevant functional unit, in this example the LSU 52, for execution. However, the LSU 52 will be arranged when subsequently executing that instruction to return over path 694 to the register cache control logic 690 an indication of the base register used for the load instruction, and also to return over path 696 to the register cache 120 the base address contained within that register. The register cache control logic 690 will then be arranged to issue a control signal over path 692 to the register cache 120 to cause a cache entry within that register cache to be populated with the data returned over path 696. The register cache control logic 690 will via the control path 692 cause the register number to be entered in the corresponding tag field 672, and the valid bit 670 to be set.

The control logic 20 can also be arranged such that if any other functional unit alters the value stored within the base register cached within the register cache 120, then details of that update are broadcast back to the register cache control logic 690 over path 694, along with the relevant data being provided over path 696, whereby the register cache control logic 690 can cause the updated value to be stored in the relevant entry of the register cache 120. In particular, in that instance, the register cache control logic 690 can be arranged to compare the register number received over path 694 with any register numbers stored within the tag portions 672 of valid cache entries of the register cache (as received over path 684), and in the event of any match to cause the updated data value provided over path 696 to be stored in the data portion 674 of that register cache entry.

Accordingly, at some future point, it can be seen that the compare logic 680 will be able to compare any tag portions 672 within the register cache 120 with base register indications provided over path 642 from the preliminary decode logic 640. In the event of there being a match, a hit signal is output over path 682 to the effective address generator logic 650, which is also arranged to receive over path 662 the data value stored in the data field 674 of the relevant register cache entry. This data value will be referred to as BASE', which is also arranged to be output with the instruction to the decode logic associated with the functional units 50.

The preliminary decode logic 640 is also arranged to determine from the instruction the immediate value, which is output over path 646 to the adder logic 660, and also output over path 648 to the decode logic with the associated instruction output over path 632. It will be appreciated that the decode logic associated with the functional units 50 will also include duplicate decode functionality to cover the fall-back position where no prediction of the effective address is made by the prefetch unit 600.

The adder 660 is arranged to generate a predicted effective address EA' which is output over path 652 to the data cache 60. The logic 650 is also operable to generate a control signal over path 654 referred to as the "SpeculatedOnLoad" signal, which is routed with the predicted effective address to the data cache, and is also output to the decode stage. The SpeculatedOnLoad signal is set to indicate situations in which a hit was detected in the register cache, the instruction was predecoded as a load instruction, and a data cache access was initiated by the logic 650 for a speculative load.

It will be appreciated that the data cache 60 will need to have some arbitration logic associated therewith to arbitrate between normal data cache accesses, for example those made by the load-store unit 52, and the speculative load accesses made by the logic 650. However, assuming that the data cache 60 is able to return a data value from the data cache in time for it to be routed over path 66 to the decode logic along with the relevant instruction on path 632, and the BASE', immediate and SpeculatedOnLoad signals, then an Rd'_Returned signal is also output over path 64 to indicate that the data on path 66 is valid.

In FIG. 6A, the various signals routed to the decode logic associated with the functional units are shown as emanating from different elements of the prefetch unit and from the data cache. It will be appreciated that the decode logic of the processor core may include suitable buffering logic to temporarily store these various signals until they are needed. Alternatively, it may be desired to output some of the signals to the decode logic some cycles after the initial generation of those signals, i.e. until the corresponding instruction proceeds from the instruction buffer to the decode logic. This may be achieved by routing one or more of these speculation signals via the instruction buffer for later broadcast to the decode logic.

The register cache 120 illustrated in FIG. 6A is in one embodiment operated in an imprecise mode of operation, where no check is made that the data in each cache entry of the register cache is up-to-date before that data is used in the prediction of an effective address. Hence, the various signals illustrated in FIG. 6A as being output to the decode stage associated with the load-store unit 52 are used as part of a check procedure to determine whether the prediction of the effective address was in fact correct. There is the potential for the prediction to be incorrect, for example because an instruction already in the pipeline may update the register containing the base address after the speculative access has been performed by the prefetch unit but before the actual load instruction reaches the LSU 52.

Figure 6B:
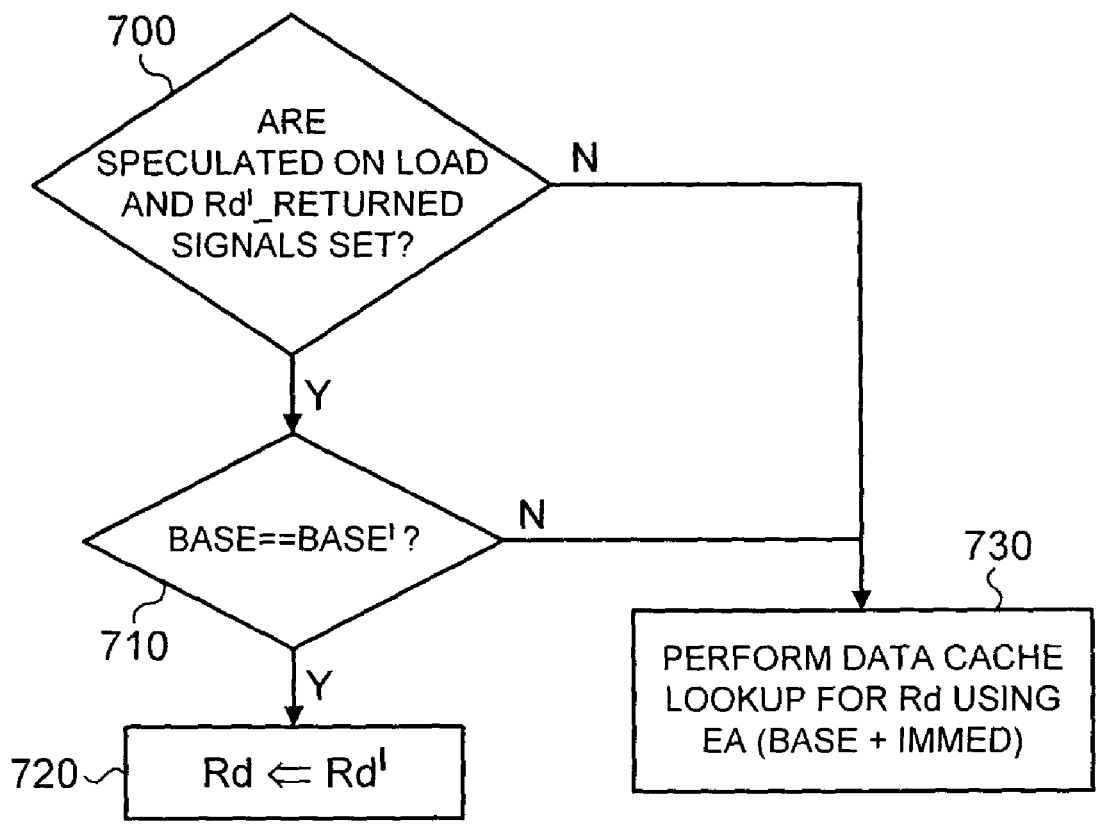
FIG. 6B is a flow diagram illustrating processing performed within a load-store unit of the data processing apparatus to subsequently determine whether the prediction performed by the logic of FIG. 6A was correct.

The manner in which the various signals illustrated in FIG. 6A as being output to the decode stage associated with the load-store unit 52 are used will now be described with reference to the flow diagram of FIG. 6B. The following is pseudo-code illustrating the operation performed within a particular pipeline stage of the LSU 52, which is also schematically illustrated by the flow diagram of FIG. 6B.

```
EA <= Base + IMMED
if (SpeculatedOnLoad && Rd'_Returned) {
    if (Base == Base') {
        // speculation correct
        Rd <= Rd';
    }else{
        // speculation wrong
        Rd <= MEM [EA]; // perform load from data
        cache - multi-cycle operation
    }
}else{
    // No speculation or data not returned
    Rd<= MEM [EA]; // perform load from data
    cache - multi-cycle operation
}
```

In one particular embodiment, the operation illustrated by the above pseudo code takes place in a "calculate" pipeline stage of the LSU 52 following a decode stage and an issue stage within the pipeline. Within this pipeline stage, the actual effective address (EA) for the load operation is calculated within the LSU by adding the base address (Base) read from the register (or from the relevant cache entry of control register 110 if the LSU is configured as described earlier with reference to FIG. 4) with the immediate value (IMMED) specified by the instruction. At the same time, the process illustrated in FIG. 6B is performed, and accordingly at step 700 it is determined whether the SpeculatedOnLoad signal was set and the Rd'_Returned signal was set. Unless both of these signals are set it is apparent that any prediction performed by the logic 650 within the prefetch unit 600 will not be correct, and the usual data cache lookup hence needs to be performed at step 730 to obtain the required data value Rd using the actual effective address EA. However, if the SpeculatedOnLoad signal and the Rd'_Returned signals were both set, then the process proceeds to step 710, where it is determined whether the real base address (Base) corresponds with the Base' address obtained from the register cache 120. If there is not correspondence between these two values, then the process again branches to step 730 to cause the normal data cache lookup process to take place, since in that instance it is clear that the predicted data value Rd' will be incorrect. However, if it is determined at step 710 that the real base address does correspond with the Base' address, then the process proceeds to step 720, where the predicted data value Rd' is determined to be the required data value Rd, thereby avoiding the need for the LSU to perform any data cache lookup at that stage. In such instances, it will be appreciated that a significant performance improvement is yielding by having prefetched the data based on a predicted effective address.

Typically, such functionality as that providing by the logic 650 within the prefetch unit 600 would not have been feasible to provide, since it would typically be considered too costly to provide the prefetch unit 600 with its own dedicated read port to the register bank that would otherwise be required to enable a predicted effective address to be generated. However, through the use of a register cache 120 as described with reference to FIG. 6A, which is used to store base addresses and register numbers used in previous load instructions, then such prediction of the effective address is possible without requiring a dedicated read port to be provided to the register bank, thereby allowing such functionality to be performed without any additional burden on the read ports provided in connection with the register bank.

Figure 7:
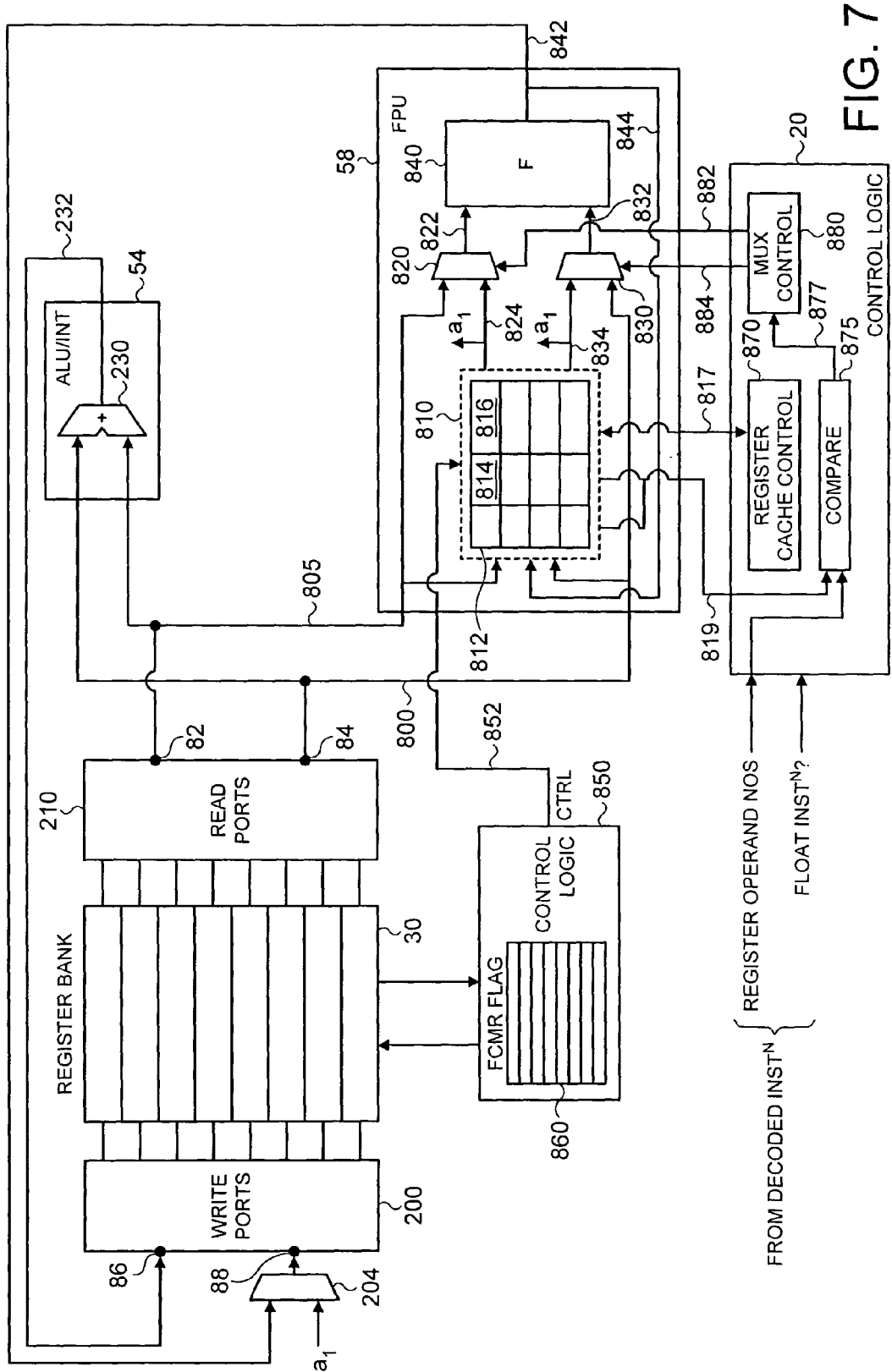
FIG. 7 is a block diagram illustrating another embodiment of the present invention.

FIG. 7 illustrates an alternative embodiment of the present invention in which a register cache 810 is provided within a floating point unit (FPU) 58 to enable local caching of floating point operands required by the FPU 58. The FPU 58 includes floating point logic 840 arranged to perform a floating point operation on two input operands received over paths 822 and 832. These input operands can be read from source registers specified by the floating point instruction via read ports 82 and 84 over paths 805, 800, respectively, with those operands then being routed via multiplexers 820 and 830 onto paths 822, 832, respectively.

The control logic 20 is arranged to receive from the decoded instruction an indication as to whether the instruction is a floating point instruction, and an indication of the register operand numbers used for such a floating point instruction. The register cache control logic 870 can then issue a control signal over path 817 to the register cache 810 to cause identified input operands received over paths 805, 800 to be stored within cache entries of the register cache 810. In particular, the register cache control logic 870 can over path 817 cause a particular entry in the register cache to have its valid bit 812 set, and for the tag portion 814 to be written with the relevant register number, whereafter when the data value is received over one of the paths 805, 800 that data value will be stored within the corresponding data portion 816 of that register cache entry.

During execution of a subsequent floating point instruction, the compare logic 875 within the control logic 20 can be arranged to compare the register operand numbers provided by the instruction with any register operand numbers stored within the tag portions 814 of valid cache entries of the register cache 810 and provided over path 819. In the event of any match, an appropriate control signal can be passed over a path 877 to the multiplexer control logic 880, to cause appropriate control signals to be passed to multiplexers 820, 830 over paths 882, 884, respectively. For example, if both source operand values are stored within the register cache 810, those values can be output over paths 824 and 834 to the multiplexers 820, 830 and those multiplexers can be controlled by the MUX control logic 880 to cause the values on paths 824 and 834 to be output to the logic 840 over paths 822 and 832, respectively. Similarly, if one of the values is stored within the register cache and the other is not, then the value that is in the register cache can be output to one of the multiplexers with that multiplexer being controlled to select that value from the register cache, whilst the other value is read from the register bank via the appropriate read port, with the other multiplexer in the pair 820, 830 being used to select the register value read from the register bank.

The floating point logic 840 will then perform the required floating point operation, and may output the result over path 842 for returning to the destination register via multiplexer 204 and write port 88 of the write ports 200. However, if the destination register is also one of the registers whose value is copied in the register cache 810, then the result output by the logic 840 can in addition, or alternatively, be output over path 844 for storing to the relevant cache entry of the register cache 810. In this instance, a control signal will typically be output from the register cache control logic 870 over path 817 to cause the register cache to update the relevant register cache entry with the data value returned over path 844.

In addition, if the logic 840 of the FPU 58 outputs a value to a destination register which that does not currently have a cache entry allocated to it within the register cache 810, the register cache control logic 870 may decide to allocate a cache entry for that destination register and cause its value to be cached in that entry, again the necessary control signals being routed over path 817.

In the event that it is decided to allow the contents of the register cache 810 to be updated over path 844, without at the same time updating the relevant destination register via the path 842, then in one embodiment of the present invention appropriate control logic 850 is provided containing a set of flags 860, one associated with each register in the register bank 30. The flags 860 will be referred to herein as "FloatCacheMoreRecent" (FCMR) flags, and are set by the control logic 850. Hence, if the result of a floating point operation performed by the logic 840 is written over path 844 to a particular cache entry of the register cache 810 without that data value also at the same time being provided over path 842 to the write port 88 for storing in the destination register, the FCMR flag associated with the destination register will be set to indicate that the value in the associated register of the register bank is not the most up-to-date value.

If any other functional unit, for example the ALU/integer unit 54 seeks to access that register of the register bank, for example because it wishes to use the contents of that register as a source operand, then the fact that the corresponding FCMR flag is set will cause the control logic 850 to issue a control signal over path 852 to the register cache 810 within the FPU 58, to cause the cache entry storing a data value for that register to output the data value over either path 824 or 834, whereby it is then broadcast over path $a_1$ to the write port 88 of the register bank via the multiplexer 204. This then causes the most up-to-date value to be stored in the relevant register, whereupon the associated FCMR flag will be reset.

If some functional unit other than the FPU 58, for example the ALU 54, is to write an updated value to a register within the register bank, this will be noted by the control logic 20, and the register cache control logic 870 will be arranged to compare the register number of the register being written to with the register number stored in each valid cache entry of the register cache 810 (as output over path 817). If a hit is detected, the register cache control logic 817 can be arranged to cause the valid bit for that entry to be reset, so that that entry's data is no longer available for use by the FPU 58.

It will be appreciated that even in situations where the FPU 58 and the ALU 54 were each provided with their own set of two read ports, and accordingly there was no conflict in the demand for the read ports by these two functional units, there may still be situations in which the provision of the register cache 810 could be beneficial. In particular, as systems become more complex, and the number of functional units increases, it may be the case that the actual path length between the read ports 210 and the FPU 58 is relatively long, thereby introducing a significant delay in the reading of data from the register bank. In that situation, the presence of the register cache 810 can significantly improve the performance of floating point operations performed within the FPU 58 in the event that the operands required are present within the register cache 810.

The register cache 810 of FIG. 7 is preferably operated in a precise mode, where the contents of any entry in the register cache are only used if the control logic 20 knows that that content is current, i.e. no updates are pending.

Figure 8A:
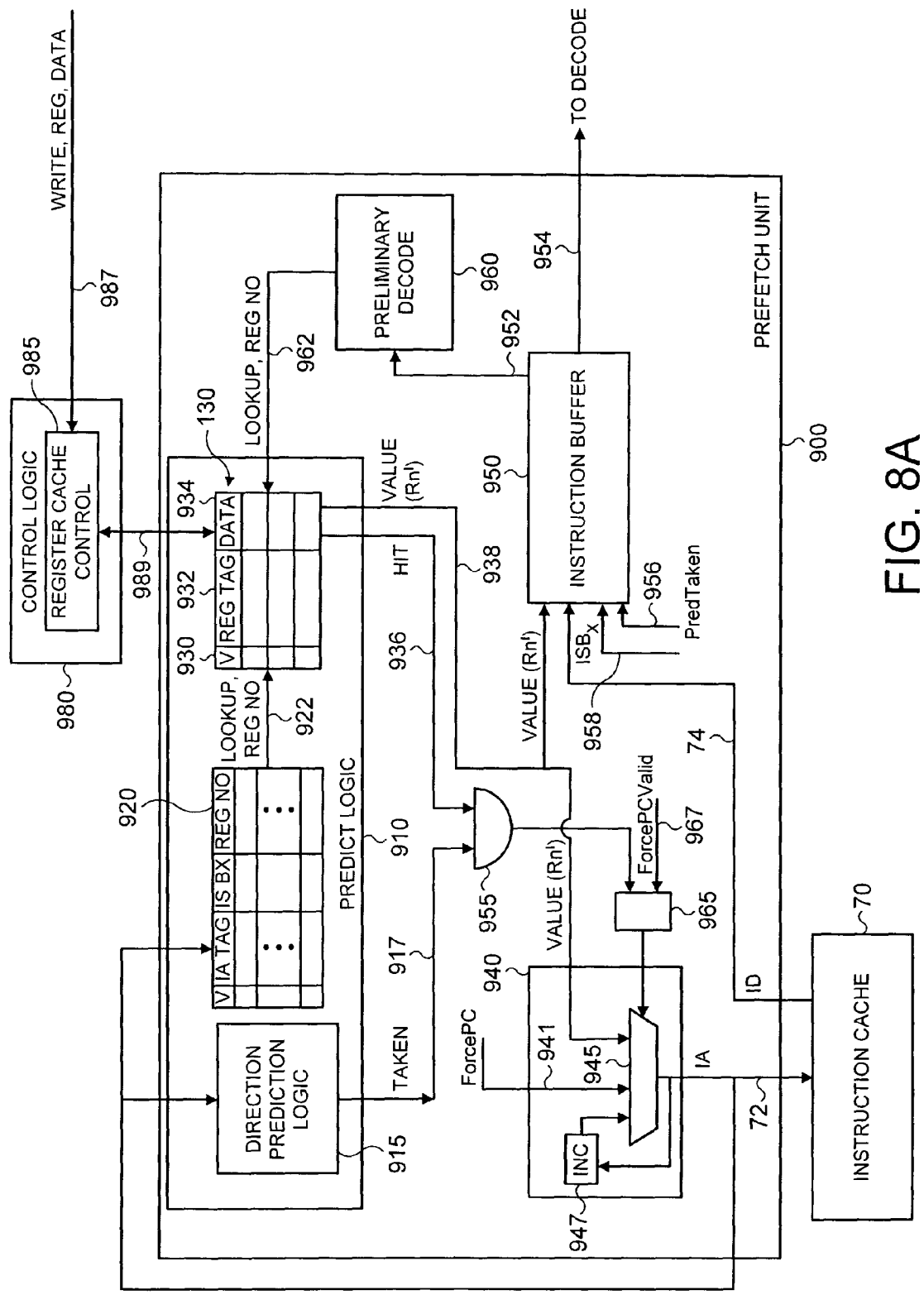
FIG. 8A is a block diagram illustrating a further embodiment of the present invention.

FIG. 8A illustrates an alternative embodiment of the present invention, where a register cache 130 is provided within the prediction logic 910 of a prefetch unit 900 to enable prediction of the target address for indirect branch instructions to be performed within the prefetch unit 900. The instruction request logic 940 within the prefetch unit 900 is arranged to issue instruction addresses over path 72 to an instruction cache 70 for a sequence of instructions that the prefetch unit determines is to be required by the functional units 50 of the data processing apparatus. These instructions as obtained from the instruction cache (or via the instruction cache from external memory) are returned over path 74 for storage in the instruction buffer 950. The instruction address as issued over path 72 is also fed back as an input to the prediction logic 910, and in particular is input to direction prediction logic 915 responsible for predicting whether, in the event that that instruction address corresponds to a branch instruction, that instruction will be taken or not taken. As will be appreciated by those skilled in the art, there are a number of known direction prediction techniques which could be used within the direction prediction logic 915 to predict the outcome of condition codes associated with the branch instruction, and hence predict whether the branch is likely to be taken or not taken.

For direct branch instructions, this information is typically all that is required to enable the prediction of the branch instruction to take place, since for direct branch instructions, the target address is provided directly within the instruction itself (the address being specified with reference to an offset value to be applied to the PC), and accordingly that target address can be calculated or stored for subsequent input to the instruction request logic 940 for use in generating the next instruction address to be issued over path 72 in the event that the direction prediction logic 915 predicts that the branch will be taken. In the event that the direction prediction logic predicts that the branch instruction will not be taken, then the next instruction address is usually obtained in a known manner by incrementing the current instruction address through incrementer 947, and then supplying that incremented address as the next instruction address.

However, in accordance with the embodiment of the present invention illustrated in FIG. 8A, a register cache 130 is used to enable prediction of indirect branch instructions, i.e. instructions where the target address for the branch instruction is specified with reference to the contents of one or more registers. Typically, such prediction of indirect branch instructions has not taken place within the prefetch unit 900, since it is generally considered not cost effective to provide a prefetch unit with a dedicated read port to the register bank.

However, in accordance with the present invention, a tag look-up structure 920 is provided within the prediction logic 910, which has a number of entries, with each entry being associated with a particular instruction address. In particular, each entry in the look-up structure 920 contains a valid bit indicating whether the entry is valid, a tag field storing a portion of an instruction address, a field indicating whether that instruction address relates to a branch instruction, in this example a Bx instruction, and a indication of the register number identified within that instruction as being the register containing data required to derive the target address. It will be appreciated that one or more register numbers may be identified in the register number field of an entry in the look-up structure 920, dependent on whether the branch instruction specifies the target address with reference to the contents of one register, or more than one register. In the example illustrated in FIG. 8A, it is assumed that one register is specified by the branch instruction, and the contents of that register directly specify the branch address. In one embodiment, the look-up structure 920 is populated using a signal supplied from the processor core as the indirect branch instructions reach an execute stage of the pipeline within the processor core.

If based on the supplied instruction address, the look-up structure 920 determines a match between the portion of that instruction address and a corresponding portion stored in the instruction address tag field of one of the entries, then it issues over path 922 a look-up request to the register cache 130, along with an indication of the register number to be looked up in the register cache 130. Initially, the register cache 130 will include no information, and so initially an indirect branch instruction will not have any prediction performed in relation to it. However, when subsequently that indirect branch instruction is executed within the relevant functional unit, then information about the register accessed, and the target address identified, can be routed back to the register cache control logic 985 within the control logic 980 over path 987, along with a "Write" control signal indicating to the register cache control logic 985 that it should make an entry in the register cache for the data provided.

The register cache control logic 985 can then issue a signal over path 989 to the register cache 130 to cause the corresponding register number to be entered in the register field 932, the target address to be entered in the data field 934, and the valid bit 930 to be set for one of the entries of the register cache 130. In this way, the register cache 130 can be populated with the register numbers and target addresses used by previous indirect branch instructions.

As an alternative to providing the actual target address data on path 987 to the register cache control logic 985 along with the register number, etc, the data can instead be routed directly to the register cache 130 in an analogous way to that illustrated earlier with reference to FIG. 6A, with the control signals passed over path 989 from the register cache control logic 985 instructing the register cache to store the data value thus provided within an identified entry of the register cache.

Hence, when the register cache 130 has been populated with at least one entry, a comparison of the register number provided over path 922 can be performed with the register numbers stored within the tag portions 932 of each entry of the register cache. Although not explicitly illustrated in FIG. 8A, such a comparison might typically be performed within compare logic within the control logic 980, such as illustrated in the earlier referenced examples, with the result that if a match is found, a hit signal can be output over path 936, along with the corresponding target address value being output from the register cache 130 over path 938.

The hit signal output over path 936 is passed to an AND gate 955, along with the taken signal output over path 917 from the direction prediction logic 915, this resulting in the generation of a control signal to the drive logic 965 used to produce a drive signal to the multiplexer 945. Hence, in the event that it is predicted that the instruction is an indirect branch instruction which is taken, and the target address is predicted as being present in the register cache, this will result in a set signal being output from the AND gate 955, which will cause the logic 965 to issue a signal to the multiplexer to cause it to select as the next instruction address the target address value Rn' provided over path 938. Alternatively, if the branch is predicted as not taken, or the required value is not in the register cache 130, then the logic 965 can instead be arranged to output a signal to cause the multiplexer to select as the next instruction address the output from the incrementer 947. Alternatively, the logic 965 may take into account other prediction schemes (not shown in FIG. 8A), for example direct branch prediction schemes, when determining the appropriate control signal to issue to the multiplexer 945.

As also shown in FIG. 8A, the logic 965 is arranged to receive a ForcePCValid signal over path 967, and also the multiplexer 945 is arranged to receive a ForcePC value over path 941. As will be described later these signals will be used in the event that any prediction performed by the prefetch unit 900 proves later to be wrong, or if a branch instruction is executed which was not predicted by the prefetch unit 900,in which event the data processing apparatus is arranged to cause any instructions already in the pipeline of the relevant functional unit to be flushed, along with any instructions in the instruction buffer, and instead to cause the next instruction to be obtained from an instruction address specified by the ForcePC value provided over path 941, the ForcePCValid signal 967 being used to cause the logic 965 to generate the appropriate control signal to the multiplexer 945 to cause selection of the ForcePC value.

As an alternative to using the look-up structure 920, or in addition to such an approach, preliminary decode logic 960 can also be provided for reviewing instructions in the instruction buffer and performing some preliminary decode to determine whether those instructions relate to an indirect branch instruction, and in that event the register number or numbers specified by that instruction. In the event that an indirect branch instruction is identified by the preliminary decode logic 960, a look-up request is output over path 962 to the register cache 130, along with the identified register number (s) to cause a look-up process to be performed in a similar manner to that described earlier with reference to the look-up requested by the look-up structure 920. Again, in the event of a hit, this will result in a hit signal being output over path 936, along with the value in the relevant register cache entry being output over path 938.

Irrespective of whether the look-up is initiated by the look-up structure 920 or the preliminary decode logic 960, in the embodiment illustrated in FIG. 8A various information is stored within the instruction buffer in addition to the instruction itself. In particular, as illustrated in FIG. 8A, the target address value output over path 938 is stored within the instruction buffer, as is a control (IsBx) signal input over path 958 indicating whether the instruction is an indirect branch instruction. Further, a PredTaken signal is input to the instruction buffer over path 956 which is set in situations where it is predicted that the branch is taken and a hit is detected within the register cache 130 (i.e. this PredTaken signal can be deduced from the output of AND gate 955). This information is then output over path 954 to the decode logic in association with each instruction. In the example of FIG. 8A, it is assumed that the prediction described can be performed in sufficient time for these various values to be fed back into the instruction buffer for storing with the instruction. However, as an alternative, it will be appreciated that an approach similar to that described with reference to FIG. 6A could be performed where the individual values are output directly to the decode logic rather than being stored within the instruction buffer 950.

The register cache 130 illustrated in FIG. 8A is in one embodiment operated in an imprecise mode of operation, where no check is made that the data in each cache entry of the register cache is up-to-date before that data is used in the prediction of a target address.

When the indirect branch instruction reaches a predetermined pipeline stage within the relevant fictional unit, a determination will be made as to whether any prediction performed by the prefetch unit 900 is correct, and if not to cause corrective action to be taken. The following pseudo code illustrates the processing that may be provided at that pipeline stage:

```
ForcePCValid <= FALSE;
if (IsBx) {
    if (PredTaken && BranchActuallyTaken) {
        if (Rn == Rn') {
            // Prediction correct
            ForcePCValid <= False;
        } else{
            //Rn ! = Rn'
            ForcePC <= Rn;
            ForcePCValid <= TRUE;
        }
    } else if (PredTaken) {
        //PredictTaken wrong
        ForcePC <= Recovery PC
        ForcePCValid <= TRUE;
    } else if(!PredTaken && BranchActuallyTaken) {
        ForcePC <=Rn;
        ForcePCValid <=TRUE;
    }
} else if (IsB) { // Direct branch instruction handling
    // Treatment of direct branches would follow here ...
    .
    .
}
```

Figure 8B:
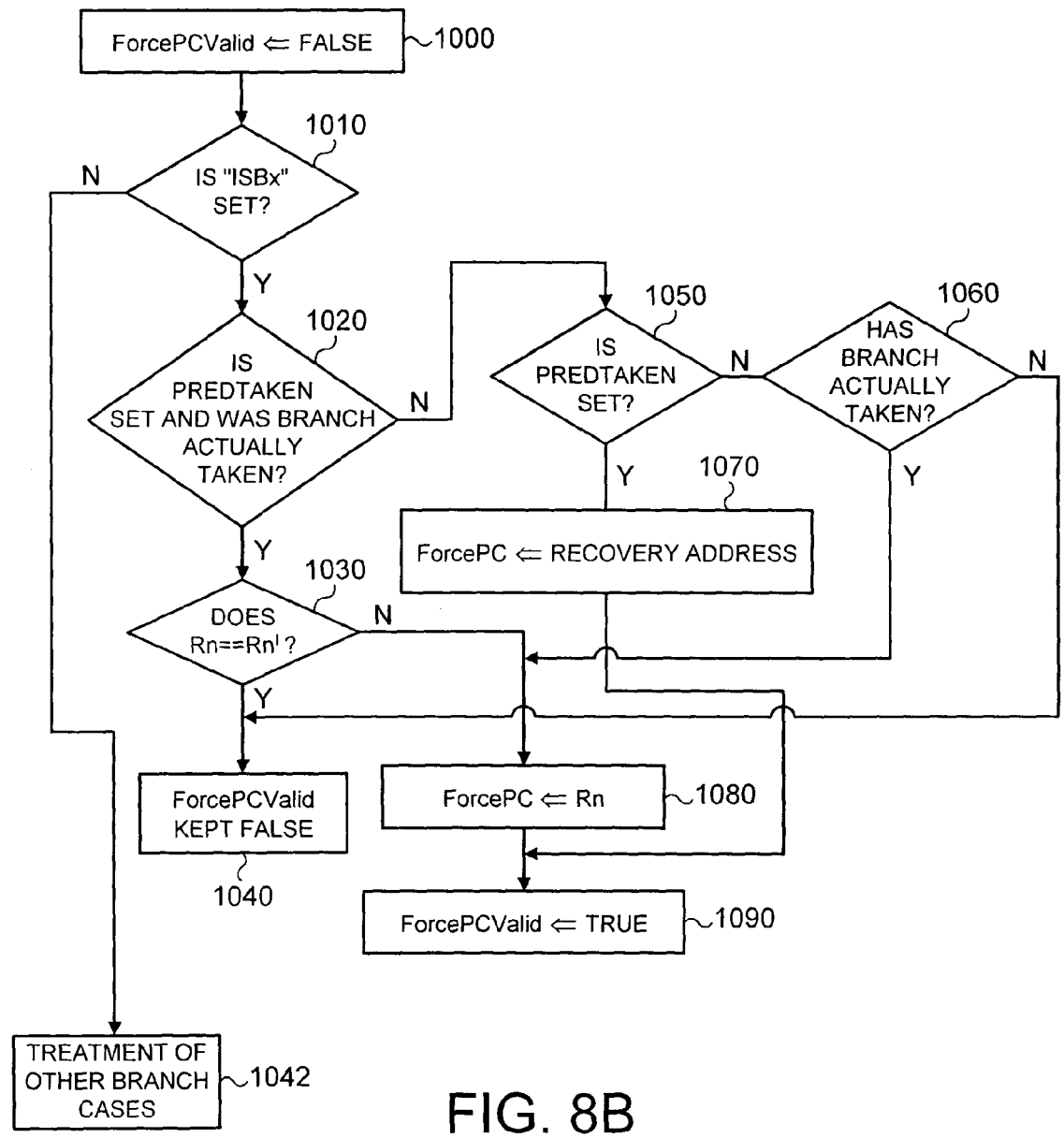
FIG. 8B is a flow diagram of processing performed when an instruction prefetched by the prefetch unit of FIG. 8A is subsequently executed within the data processing apparatus to determine whether the prediction performed by the logic of FIG. 8A is correct, and to determine any corrective action required.

FIG. 8B illustrates as a flow diagram the operation illustrated by the above pseudo code. In particular, at step 1000, the ForcePCValid signal is set to False, and then at step 1010 it is determined whether the signal "IsBx" is set. If not, the process proceeds directly to step 1042, where other branch cases such as direct branches would typically be handled, using any of a number of known techniques.

However, if it is determined that the IsBx signal is set, then the process proceeds to step 1020, where it is determined whether the PredTaken signal is set and the branch was actually taken. If both of these conditions are met, the process proceeds to step 1030, where it is determined whether the actual target address (Rn) determined from the relevant register value corresponds with the predicted target address (Rn') determined by the prefetch unit 900. If so, the process proceeds to step 1040 where the ForcePCValid is kept false, since in this scenario the prediction made was correct and no corrective action is required. However, if at step 1030 it is determined that the predicted target address does not correspond with the actual target address, for example because the data stored in the register cache 130 does not correspond with the actual data as stored within the register when the indirect branch instruction was subsequently executed (as mentioned earlier, in the FIG. 8A example an imprecise mode of operation is being employed where the register cache contents 130 are not necessarily always up-to-date with the current contents of the register bank, since there may be some latency in the cache entry being updated), then the process proceeds to step 1080, where the actual target address is set to be the ForcePC value provided over path 941, and then at step 1090 the ForcePCValid signal is set to TRUE to cause the current pipeline to be flushed along with the contents of the instruction buffer 950, and to cause the next address prefetched by the instruction request logic 940 to be that identified by the ForcePC value.

If at step 1020 it was determined that not both of the conditions identified at that step were met, then the process branches to step 1050 where it is determined whether the PredTaken signal is set. If so, this indicates that the prediction made was wrong, i.e. the prefetch unit predicted that the branch would be taken but in actual fact it was not (since otherwise the process would have proceeded from step 1020 to step 1030), and accordingly the process proceeds to step 1070 where a recovery address is set to be the ForcePC value, after which the process proceeds to step 1090 where the ForcePCValid signal is set to TRUE to cause that ForcePC value to be used to prefetch the next instruction. The concept of recovery addresses will be well known to those skilled in the art. In the event that a branch was predicted as taken, and accordingly the predicted target address was used, then the recovery address will typically be an incremented version of the program counter value identifying the branch instruction, since this would have been the value that would otherwise have been used to generate the address for the next instruction.

If at step 1050, it is determined that the PredTaken signal was not set, it is then determined at step 1060 if the branch was actually taken. If so, this again indicates that the prediction was wrong i.e. the prediction predicted that the branch would not be taken but actually it was taken, or no prediction was made at all, and accordingly the process branches to step 1080, wherein the actual target address is set as the ForcePC value, whereafter the ForcePCValid signal is set at step 1090 to TRUE to cause the instruction at the required target address to be retrieved from the instruction cache 70. If instead it is determined that the branch was not actually taken at step 1060, then this indicates that the prediction made was in fact correct, i.e. it was predicted that the branch would not be taken and indeed it was not taken, and accordingly the process proceeds directly to step 1040, where the ForcePCValid signal is kept FALSE.

With the approach illustrated in 8A and 8B, it can be seen that the prefetch unit 900 can be used to perform predictions for indirect branch instructions, without the need to provide the prefetch unit with a dedicated read port to the register bank to obtain the data values required to predict the target addresses, thereby making it a much more realistic proposition to perform indirect branch predictions within the prefetch unit 900. Since the target address prediction will be checked later on in the pipeline, incorrect target addresses can be recovered from at that point. Accordingly, in the example of FIG. 8A, the register cache 130 can be operated in an imprecise mode where at that time its contents are used, those contents are not always up-to-date with any changes in the contents of the associated registers in the register bank (due to latency in the cache entry being updated), and accordingly it is not necessary to interlock the target address prediction when there are any pending updates to the associated registers of the register bank.

If this scheme is used in conjunction with a software convention of using the same register numbers as source operands of indirect branches, then good prediction accuracy can be achieved.

As an alternative to the above imprecise mode of operation, it could be arranged that the register cache 130 is operated in a precise mode, in which any updates to registers whose values are stored within the register cache are also reflected within the register cache contents before those register cache contents are allowed to be used. If a hit in an entry of the register cache is determined, but that entry is awaiting an update, then the branch prediction logic can be arranged either to await the update before making the prediction, or alternatively may be arranged in such an instance to make no prediction.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus comprising:
   a plurality of registers for storing items of architectural state;
   a plurality of functional units, each functional unit for performing a processing operation with reference to at least one of said items of architectural state;
   at least one of said functional units having a register cache associated therewith having one or more cache entries, each cache entry for storing a copy of one of said items of architectural state and a register identifier identifying the register containing that item of architectural state;
   control logic means for determining a subset of said items of architectural state to be copied in said register cache, said subset comprising at least one item of architectural state which, having regard to the processing operation of the functional unit with which said register cache is associated, is likely to be referred to multiple times, wherein the at least one of said functional units comprises a prefetch unit, the processing operation is a branch prediction operation for an indirect branch instruction, and the subset of said items of architectural state to be copied in said register cache comprises the value of one or more registers within said plurality of registers operable to store data from which a target address can be derived, wherein the prefetch unit is operable to issue an instruction address for an instruction to be prefetched, the prefetch unit further comprising a tagged lookup structure for storing, for a number of instruction addresses, an indication as to whether the instruction at that instruction address is an indirect branch instruction and one or more source registers for that instruction, the prefetch unit being operable to reference that tagged lookup structure for each issued instruction address, and in the event that that issued instruction address is identified in the lookup structure as being the instruction address of an indirect branch instruction, to cause the register cache to be referenced to determine if it contains an entry for any of the one or more source registers.

2. A data processing apparatus as claimed in claim 1, wherein the prefetch unit is operable to issue an instruction address for an instruction to be prefetched, the prefetch unit further comprising decode logic operable to determine for each prefetched instruction whether that prefetched instruction is an indirect branch instruction, and if so what the one or more source registers for that prefetched instruction are, and in the event that that prefetched instruction is an indirect branch instruction, to cause the register cache to be referenced to determine if it contains an entry for any of the one or more source registers.

3. A data processing apparatus as claimed in claim 1, wherein the prefetch unit further comprises address generation logic operable, if that data from which the target address can be derived is copied in the register cache, to generate a predicted target address from that data as retrieved from the register cache.

4. A data processing apparatus comprising:
   a plurality of registers for storing items of architectural state;
   a plurality of functional units, each functional unit for performing a processing operation with reference to at least one of said items of architectural state;

at least one of said functional units having a register cache associated therewith having one or more cache entries, each cache entry for storing a copy of one of said items of architectural state and a register identifier identifying the register containing that item of architectural state;

control logic means for determining a subset of said items of architectural state to be copied in said register cache, said subset comprising at least one item of architectural state which, having regard to the processing operation of the functional unit with which said register cache is associated, is likely to be referred to multiple times, wherein the at least one of said functional units comprises a prefetch unit, the processing operation is a branch prediction operation for an indirect branch instruction, and the subset of said items of architectural state to be copied in said register cache comprises the value of one or more registers within said plurality of registers operable to store data from which a target address can be derived, wherein the prefetch unit further comprises address generation logic operable, if that data from which the target address can be derived is copied in the register cache, to generate a predicted target address from that data as retrieved from the register cache; and analysis logic operable to subsequently determine whether the predicted target address corresponds to an actual target address derived from the data in said one or more registers within said plurality of registers, and to cause corrective action to be taken in the event that there is not correspondence between the predicted target address and the actual target address.

* * * * *